US010427417B2

(12) United States Patent
Greggio

(10) Patent No.: US 10,427,417 B2
(45) Date of Patent: Oct. 1, 2019

(54) SYSTEMS, METHODS, AND ARTICLES FOR LASER MARKING MACHINE-READABLE SYMBOLS

(71) Applicant: Datalogic IP Tech, S.r.l., Bologna (IT)

(72) Inventor: Roberto Greggio, Turin (IT)

(73) Assignee: Datalogic IP Tech S.r.l., Bologna (IT)

( * ) Notice: Subject to any disclaimer, the term of this patent is extended or adjusted under 35 U.S.C. 154(b) by 272 days.

(21) Appl. No.: 15/539,595

(22) PCT Filed: Dec. 24, 2014

(86) PCT No.: PCT/IT2014/000350
§ 371 (c)(1),
(2) Date: Jun. 23, 2017

(87) PCT Pub. No.: WO2016/103288
PCT Pub. Date: Jun. 30, 2016

(65) Prior Publication Data
US 2018/0333962 A1 Nov. 22, 2018

(51) Int. Cl.
*B41J 2/315* (2006.01)
*B23K 26/082* (2014.01)
(Continued)

(52) U.S. Cl.
CPC ............. *B41J 2/315* (2013.01); *B08B 7/0042* (2013.01); *B23K 26/0665* (2013.01);
(Continued)

(58) Field of Classification Search
CPC ............ B41J 2/321; B41J 2/315; B41J 2/442; B23K 26/0665; B23K 26/08;
(Continued)

(56) References Cited

U.S. PATENT DOCUMENTS 4,987,287 A * 1/1991 Jack ........................ B41C 1/145
219/121.69
5,155,324 A * 10/1992 Deckard ................. B22F 3/004
264/497
(Continued)

FOREIGN PATENT DOCUMENTS

EP 0 927 947 A2 7/1999
WO 2009/035209 A1 3/2009

OTHER PUBLICATIONS

International Search Report, dated Sep. 11, 2015, for International Application No. PCT/IT2014/000350, 5 pages.
(Continued)

*Primary Examiner* — Anh T Vo
(74) *Attorney, Agent, or Firm* — Cozen O'Connor

(57) ABSTRACT

Systems and methods for generating machine-readable symbols on surfaces of objects using laser marking systems and processes. A specialized contour fill pattern for a laser beam path may be used that combines modules of a machine-readable symbol into bounded blocks or islands according to adjacencies and/or according to role (e.g., finder pattern, timing pattern, encoded payload data). In some implementations, the islands of modules may be filled using a laser beam path that traverses contour path lines from inner path lines to outer path lines. Once the islands have been generated during pre-processing, they are sorted to reduce the required time for the laser to "jump" (i.e., move with the laser turned off) from one island to a subsequent island to be filled. A filling pattern for bounded areas with sharp corners (e.g., squares, rectangles) may be simplified by rounding corners to optimize speed while maintaining suitable marking quality.

20 Claims, 16 Drawing Sheets

(51) Int. Cl.
  *B23K 26/06*   (2014.01)
  *B23K 26/08*   (2014.01)
  *B41J 2/44*    (2006.01)
  *B08B 7/00*    (2006.01)
  *B44C 1/22*    (2006.01)
  *G06K 1/12*    (2006.01)
  *G06K 15/12*   (2006.01)

(52) U.S. Cl.
  CPC ............ *B23K 26/08* (2013.01); *B23K 26/082* (2015.10); *B41J 2/442* (2013.01); *B44C 1/228* (2013.01); *G06K 1/126* (2013.01); *G06K 15/1228* (2013.01)

(58) Field of Classification Search
  CPC ..... B23K 26/082; B08B 7/0042; B44C 1/228; G06K 1/126; G06K 15/1228
  See application file for complete search history.

(56) References Cited

U.S. PATENT DOCUMENTS

| | | | |
|---|---|---|---|
| 6,734,392 B2 * | 5/2004 | Philipp | B23K 26/0838 219/121.68 |
| 7,397,014 B2 * | 7/2008 | Hart | B23K 26/08 219/121.68 |
| 2005/0123864 A1 | 6/2005 | Franklin | |
| 2013/0270269 A1 | 10/2013 | Lewis | |

OTHER PUBLICATIONS

Written Opinion of the International Searching Authority, dated Sep. 11, 2015, for International Application No. PCT/IT2014/000350, 7 pages.

* cited by examiner

SYSTEMS, METHODS, AND ARTICLES FOR LASER MARKING MACHINE-READABLE SYMBOLS

BACKGROUND

Technical Field

The present disclosure relates generally to laser marking of machine-readable symbols.

Description of the Related Art

Machine-readable symbols encode information in a form that can be optically read via a machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically made of patterns of high and low reflectance areas. For instance, a one-dimensional barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars, squares) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, Quick Response (QR) code, etc.

Machine-readable symbols may be made up of various types of payload data information and non-payload data information. For example, a Quick Response (QR) code symbol may be made up of non-payload data finder pattern, a timing pattern, an alignment pattern, format information, and a quiet zone in addition to the encoded payload data. "Payload data" or "payload information" is intended to include any kind of data and information relating to objects or persons which can be encoded into a machine-readable symbol, like for example identification data (e.g., names, part numbers), delivery address data, production lot data, expiration date, weight data, size data, etc. In summary, "payload" refers to the actual intended content, as opposed to "overhead" data or information (e.g., finder pattern, timing pattern) used to facilitate reading, transmission, decoding, etc. As another example, a Data Matrix code symbol includes a central payload data area, a non-payload finder pattern of two solid lines in an L-shape and two broken lines forming its perimeter. The Data Matrix code symbol is surrounded on all four sides by a quiet zone border. The L-shaped solid border of the Data Matrix code symbol is used primarily to define the physical size of the symbol and its orientation and distortion, whereas the broken borders at the opposite corner define the symbol's cell or module structure.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a fork lift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Manufacturing requirements for direct part or product marking with machine-readable symbols are growing rapidly. Direct part marking enables tracking of an object from the time of manufacturing until the end of the object's useful life. This demand may be driven by the increasing requirements or preferences for object traceability.

Direct part marking processes may utilize digital process technology such as inkjet, dot peen and laser marking. For many three-dimensional products, laser marking is the preferred method because the process may yield high-contrast indelible markings and does not require consumable ink costs/solvents or post curing. Further, lasers are able to generate very small machine-readable symbols which may be important for applications where there is limited surface area on an object to be marked (e.g., on a printed circuit board).

To meet production requirements, marking parts with machine-readable symbols should be done as fast as possible while maintaining sufficient quality to provide acceptable readability of the symbol throughout the object's useful life.

A laser marking system generally includes a laser and a controller coupled to the laser. The laser acts similar to a pencil—the beam emitted from it allowing the controller to trace a pattern onto a surface on which the marking is to be made. The controller, which may be a processor-based device, controls the direction, intensity, speed of movement, spread of the laser beam, or other parameters.

A laser marking system may work in either a raster mode or a vector mode. Raster marking traces the laser across the surface in a back-and-forth linear pattern. An advantage of rasterizing is the simple "fill" the rasterizer produces, but the process can be quite slow.

Vector marking follows the line and curve of the pattern to be marked, much as a pen-based plotter draws by constructing line segments from a description of the outlines of a pattern. "Fill" areas are mostly done by hatching the surface with parallel linear strokes following a single direction or a bidirectional path. These filling methods provide a uniform surface treatment but are slow and imprecise along the edges, since a scan head controlling the laser must make a discontinuous path, and the laser source must be continuously turned on and off to avoid marking during the movement from the end of one stroke to the beginning of a subsequent stroke.

BRIEF SUMMARY

A method of operation in a machine-readable symbol laser marking system including at least one processor having at least one nontransitory processor-readable medium communicatively coupled to the at least one processor and which stores at least one of processor-executable instructions or data may be summarized as including obtaining, by the at least one processor, machine-readable symbol data representative of a machine-readable symbol, the machine-readable symbol having a plurality of first type modules that collectively encode information of a first type and a plurality of second type modules that collectively encode information of a second type, the information of second type different from the information of a first type; grouping, by the at least one processor, the plurality of first type modules into one or more first type bounded areas, each first type bounded area including a continuous outer boundary; grouping, by the at least one processor, the plurality of second type modules into one or more second type bounded areas, each second type bounded area including a continuous outer boundary; for each bounded area of the one or more first type bounded areas and second type bounded areas, generating, by the at least one processor, a bounded area fill pattern including an outer boundary path line corresponding to the outer boundary of the bounded area and progressively smaller path lines offset from each other; and generating, by the at least one processor, a laser beam path that directs a laser beam to traverse the bounded area fill pattern for each of the first type bounded areas and the second type bounded areas by, for each bounded area, traversing each of the path lines of the bounded area fill pattern from a start point on a starting path line to an end point on an ending path line.

Generating a laser beam path may include generating a laser beam path that directs a laser beam to successively traverse the bounded area fill pattern for each of the first type bounded areas and the second type bounded areas in a determined order. Generating a laser beam path may also include generating a laser beam path that directs a laser beam to be turned off when moved from an end point of one bounded area fill pattern to a start point of a subsequently traversed bounded area fill pattern. Obtaining machine-readable symbol data representative of a machine-readable symbol may include obtaining machine-readable symbol data representative of a machine-readable symbol, the machine-readable symbol having a plurality of payload data modules that collectively encode payload information and a plurality of non-payload modules that collectively encode non-payload information. The information of the first type may include payload data information and the information of the second type may include non-payload information. Obtaining machine-readable symbol data representative of a machine-readable symbol may also include obtaining, by the at least one processor, data to be encoded, and encoding, by the at least one processor, the data into the machine-readable symbol data. Grouping the plurality of second type modules into one or more second type bounded areas may include grouping the plurality of second type modules into one or more finder pattern bounded areas. Grouping the plurality of first type modules into one or more first type bounded areas may include grouping a number N1 of first type modules into the number N1 of first type bounded areas. Grouping the plurality of second type modules into one or more second type bounded areas may include grouping a number N2 of second type modules into a number N3 of second type bounded areas, the number N3 less than the number N2. Grouping the plurality of first type modules into one or more first type bounded areas may include grouping the number N1 of first type modules into the number N1 of first type bounded areas, the first type bounded areas each including a continuous outer boundary that is circular in shape. Generating a laser beam path may include, for each bounded area fill pattern, setting the start point on the starting path line at a directional corner, and setting the end point on the ending path line at the directional corner. Generating a bounded area fill pattern may include generating a bounded area fill pattern including an outer boundary path line and progressively smaller path lines offset from each other by a selectable offset distance. Generating a laser beam path may also include generating a laser beam path that directs a laser beam to traverse the bounded area fill pattern for each of the first type bounded areas and the second type bounded areas by, for each bounded area, traversing each of the path lines of the bounded area fill pattern from a start point on an inner path line to an end point on the outer boundary path line.

The method may also include controlling, by the at least one processor, a laser beam to traverse the laser beam path to mark a surface of an object with the machine-readable symbol. Controlling a laser beam to traverse the laser beam path to mark an object with the machine-readable symbol may include altering an optical characteristic of the object with the laser beam.

A laser marking path generation system may be summarized as including at least one processor; and at least one nontransitory processor-readable medium communicatively coupled to the at least one processor and which stores at least one of processor-executable instructions or data that when executed by the at least one processor of the laser marking path generation system, cause the at least one processor to: obtain machine-readable symbol data representative of a machine-readable symbol, the machine-readable symbol having a plurality of first type modules that collectively encode information of a first type and a plurality of second type modules that collectively encode information of a second type; group the plurality of first type modules into one or more first type bounded areas, each first type bounded area including a continuous outer boundary; group the plurality of second type modules into one or more second type bounded areas, each second type bounded area including a continuous outer boundary; for each bounded area of the one or more first type bounded areas and second type bounded areas, generate a bounded area fill pattern including an outer boundary path line corresponding to the outer boundary of the bounded area and progressively smaller path lines offset from each other; and generate a laser beam path that directs a laser beam to traverse the bounded area fill pattern for each of the first type bounded areas and the second type bounded areas by, for each bounded area, traversing each of the path lines of the bounded area fill pattern from a start point on an starting path line to an end point on an ending path line.

The at least one processor may obtain data to be encoded and encode the data into the machine-readable symbol data. The at least one processor may generate a laser beam path that directs a laser beam to successively traverse the bounded area fill pattern for each of the first type bounded areas and the second type bounded areas in a determined order. The at least one processor may generate a laser beam path that directs a laser beam to be turned off when moved from an end point of one bounded area fill pattern to a start point of a subsequently traversed bounded area fill pattern. The at least one processor may generate a laser beam path that directs a laser beam to traverse the bounded area fill pattern for each of the first type bounded areas and the second type bounded areas by, for each bounded area, traversing each of the path lines of the bounded area fill pattern from a start point on an inner path line to an end point on the outer boundary path line. The information of the first type may include payload data information and the information of the second type may include non-payload information. The at least one processor may group the plurality of second type modules into one or more finder pattern bounded areas. The at least one processor may group a number N1 of first type modules into the number N1 of first type bounded areas. The at least one processor may group a number N2 of second type modules into a number N3 of second type bounded areas, the number N3 less than the number N2. The at least one processor may group the number N1 of first type modules into the number N1 of first type bounded areas, the first type bounded areas each including a continuous outer boundary that is circular in shape. The at least one processor may, for each bounded area fill pattern, set the start point on the starting path line at a directional corner, and set the end point on the ending path line at the directional corner. The at least one processor may generate a bounded area fill pattern including an outer boundary path line and progressively smaller path lines offset from each other by a selectable offset distance. The at least one processor may control a laser beam to traverse the laser beam path to mark a surface of an object with the machine-readable symbol.

A machine-readable symbol laser marking system may be summarized as including a controllable laser that produces a laser beam; at least one processor communicatively coupled to the controllable laser; and at least one nontransitory processor-readable medium communicatively coupled to the at least one processor and which stores at least one of processor-executable instructions or data that when executed by the at least one processor of the machine-readable symbol laser marking system, cause the at least one processor to: cause the controllable laser to traverse a laser beam path to mark a machine-readable symbol on a surface of an object, the laser beam path defined by a plurality of bounded area fill patterns each corresponding to one of a first type bounded area or a second type bounded area of the machine-readable symbol, each bounded area fill pattern including an outer boundary path line corresponding to an outer boundary of the corresponding bounded area and progressively smaller path lines offset from each other, the laser beam path directs the laser beam to successively traverse the bounded area fill pattern for each of the first type bounded areas and the second type bounded areas by, for each bounded area, traversing each of the path lines of the bounded area fill pattern from a start point on an starting path line to an end point on an ending path line.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
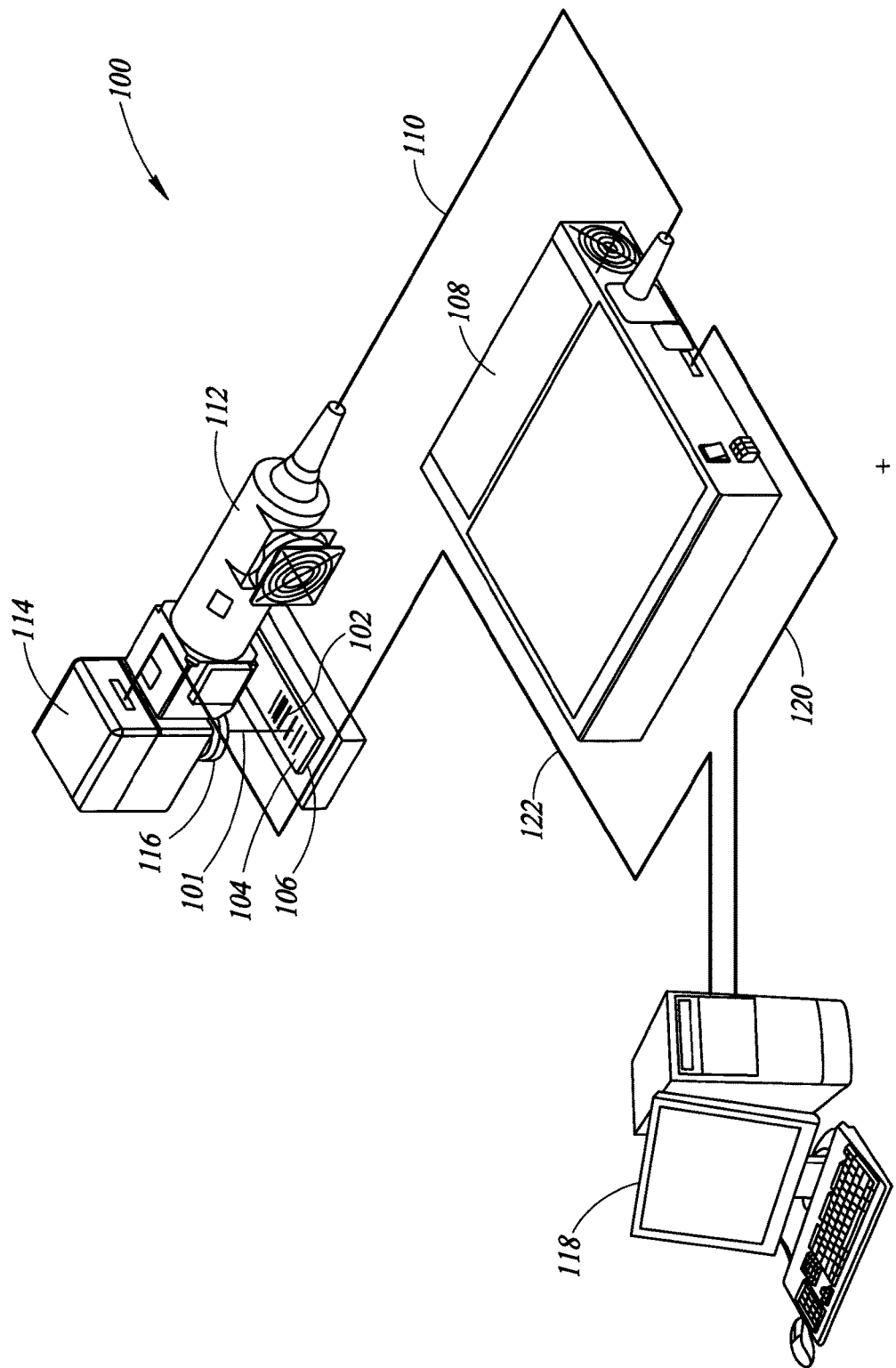
FIG. 1 is a perspective view of a laser marking system, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

One or more implementations of the present disclosure relate to generating machine-readable symbols on surfaces of objects using laser marking systems and processes that are fast, flexible, and produce quality machine-readable symbols. In some implementations, such is achieved by utilizing a specialized contour fill pattern for a laser beam path that groups or combines cells or modules of a machine-readable symbol into bounded blocks or areas (also called "islands" herein) according to adjacencies and/or according to role (e.g., finder pattern, timing pattern, encoded payload data). The bounded blocks or areas of modules may be filled using a laser beam path that traverses contour path lines preferably from inner path lines to outer path lines, which allows for waste material produced to be pushed outside of the boundaries of the resulting machine-readable symbol marking. Once the bounded blocks or areas have been generated during pre-processing, the order in which they are marked is optimized to reduce or minimize the required time for the laser to "jump" (i.e., move with the laser turned off) from one block to a subsequent block to be filled. In some implementations, a filling pattern for bounded areas with sharp corners (e.g., squares, rectangles) may be simplified or approximated by rounding corners to optimize speed while maintaining suitable marking quality.

FIG. 1 illustrates an example laser marking system 100 that utilizes a laser beam 101 to mark a machine-readable symbol 102 on a surface 104 of an object 106 spaced apart from the laser marking system by a working distance, for example, 15 centimeters, 30 centimeters, 50 centimeters, etc. The laser marking system 100 includes a laser source 108 coupled via a cable 110 to a resonator 112, and a scan head 114. The laser beam 101 from the laser source 108 and the resonator 112 passes through the scan head 114 and through an optics assembly 116 (e.g., f-theta lens) and is incident on the surface 104 of the object 106.

The laser marking system 100 also includes a laser marking control system 118 in communication with the laser source 108 and the scan head 114 via cables 120 and 122, respectively, or other suitable wired or wireless connection. As discussed in detail below with reference to FIG. 3, the laser marking control system 118 may comprise one or more processor-based devices including at least one processor and at least one nontransitory computer- or processor-readable storage medium communicatively coupled to the at least one processor which stores at least one of instructions to be carried out by the one or more processors or data accessible to the one or more processors. The laser marking control system 118 may also include one or more local or remote user interfaces which allow a user to interact with the laser marking control system.

The laser marking control system 118 controls the operation of the laser source 108 and the scan head 114. For example, the laser marking control system 118 may control the scan head 114 and/or the laser source 108 to adjust the direction of the laser beam 101, the speed at which the laser beam is oriented, or the size of the spots used to create the machine-readable symbol 102.

Figure 2:
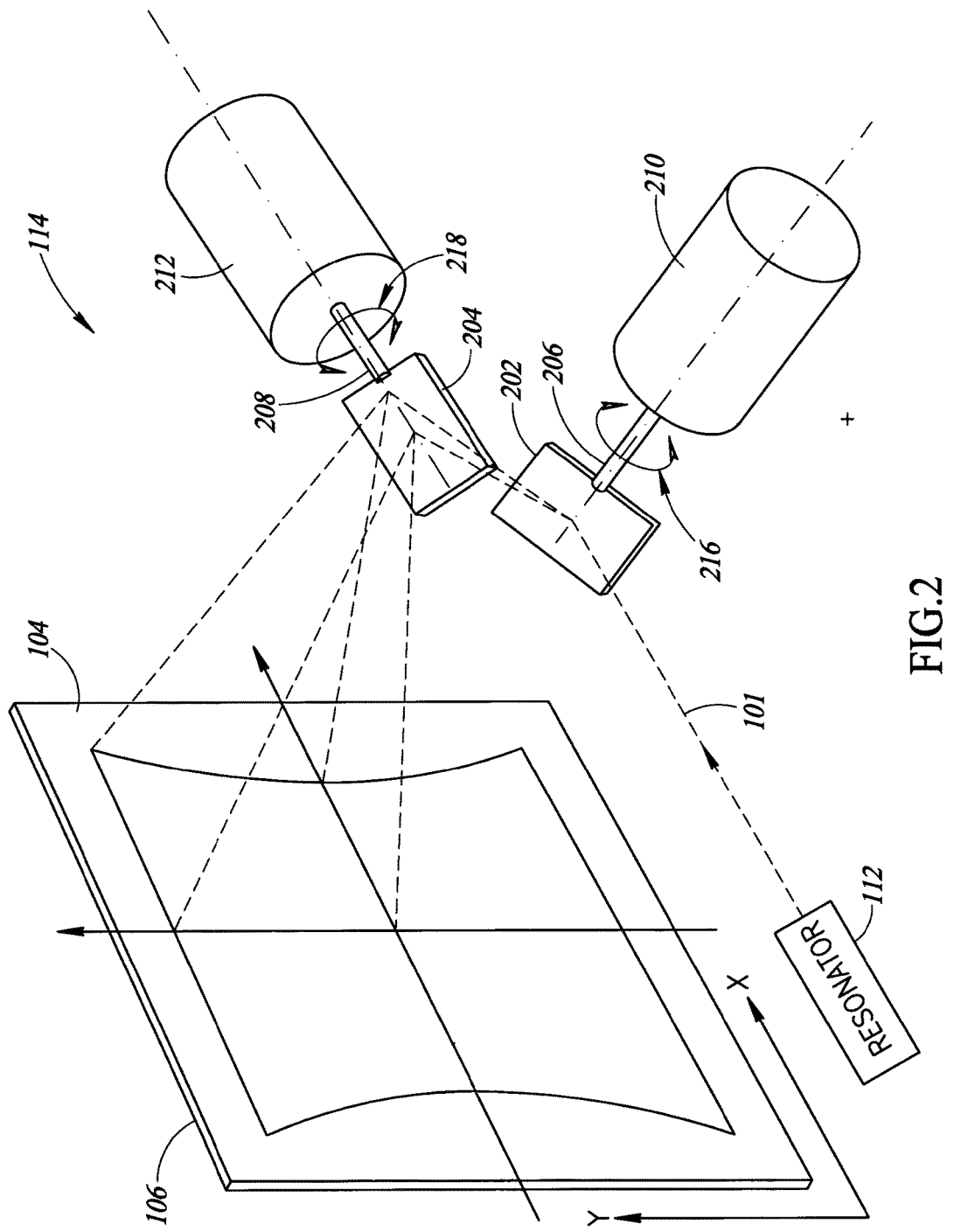
FIG. 2 is a perspective view showing an example configuration of components of a scan head in the laser marking system of FIG. 1, according to at least one illustrated embodiment.

FIG. 2 illustrates an example configuration of scan mechanism components in the scan head 114 of FIG. 1. The scan mechanism includes an X-axis mirror 202 and a Y-axis mirror 204 fitted to rotating shafts 206 and 208, respectively, which are perpendicular to each other, and includes an X-axis galvanometer 210 and a Y-axis galvanometer 212 which rotationally oscillate (turn) the mirrors 202 and 204, respectively.

After having entered the scan head 114, the laser beam 101 from the laser source 108 and the resonator 112 first impinges on the X-axis mirror 202, at which the laser beam 101 is reflected to impinge on the Y-axis mirror 204, at which the beam is reflected to pass through the optical assembly 116 (FIG. 1) to be focused on the surface 104 of the object 106 for irradiation. The optical assembly 116 may be used to reduce certain distortion effects, for example. Distortion or other non-linearity may also be corrected by logic of the laser marking control system 118.

The X-axis mirror 202 is allowed to rotationally oscillate (turn) in the direction indicated by the arrow 216 by the drive of the X-axis galvanometer 210. Similarly, the Y-axis mirror 204 is allowed to rotationally oscillate (turn) in the direction indicated by the arrow 218 by the drive of the Y-axis galvanometer 212.

In some implementations, the X-axis galvanometer 210 incorporates a controllable moving armature (rotor) coupled to the X-axis mirror 202. The moving armature may move in accordance with an X-direction scan control signal provided by the laser marking control system 118. The Y-axis galvanometer 212 may also have the same configuration. That is, a Y-axis galvanometer 212 may incorporate a controllable moving armature (rotor) that turns through an angle specified by a Y-direction scan control signal provided by the laser marking control system 118.

Thus, synchronous with the laser beam 101 from the resonator 112 which enters the scan head 114 at predetermined timings, the two galvanometers 210 and 212 turn the X-axis scan mirror 202 and the Y-axis scan mirror 204, respectively, through their respective predetermined angles in response to the X-direction and Y-direction scan control signals provided by the laser marking control system 118 so that a beam spot of the laser beam 101 scans over the surface 104 of the object 106 to be marked.

Figure 3:
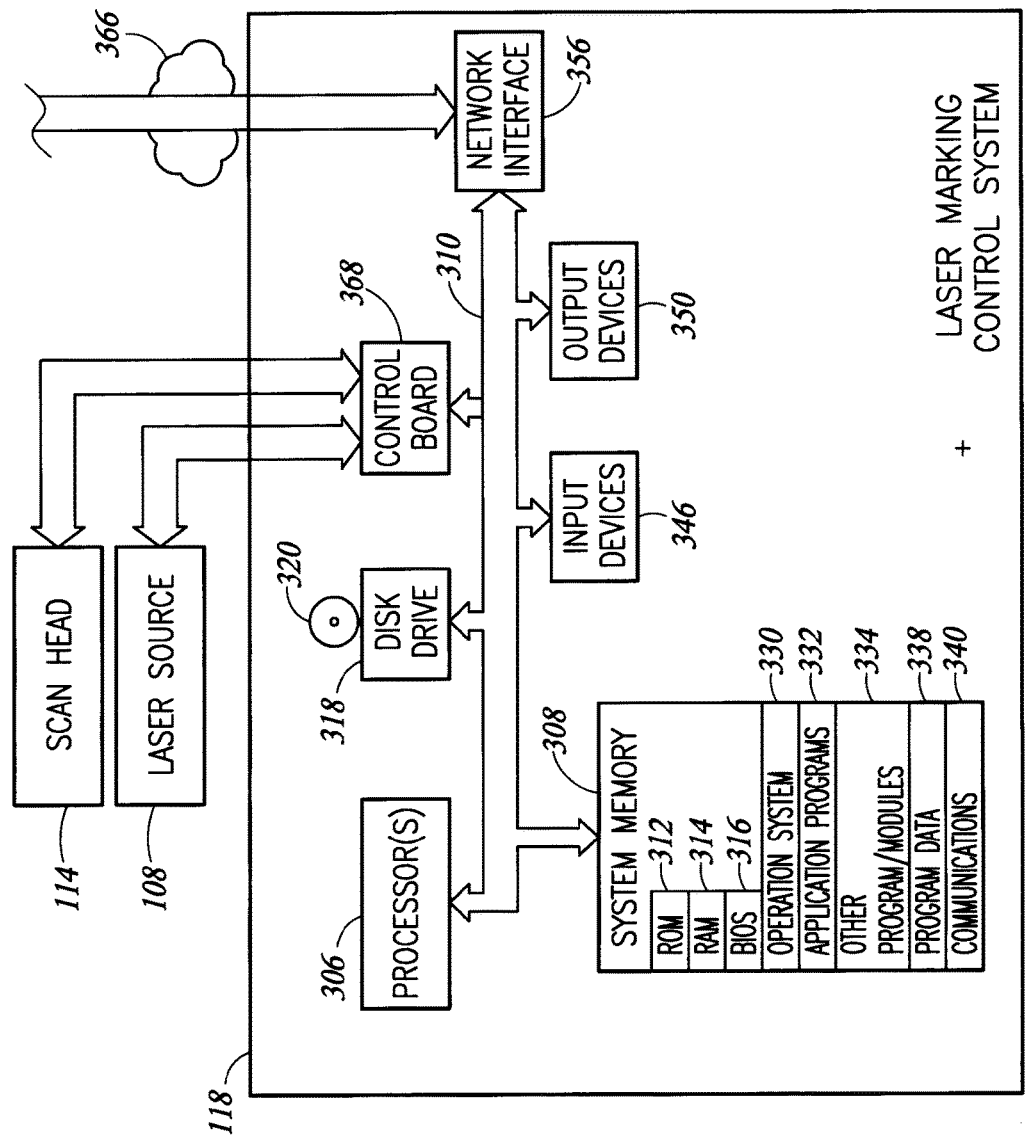
FIG. 3 is a functional block diagram of a laser marking control system of the laser marking system of FIG. 1, according to at least one illustrated embodiment.

FIG. 3 and the following discussion provide a brief, general description of the components forming the laser marking system 100 including the laser marking control system 118, the laser source 108, and the scan head 114 in which the various illustrated embodiments can be implemented. The laser marking system 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The laser source 108 and resonator 112 may be any types suitable for laser marking applications. For example, the laser source 108 and resonator 112 may be a FILOS™ pulsed fiber laser source or a VLASE™ Series laser available from Datalogic Automation, S.r.l. Such lasers may operate at one or more wavelengths, such as 355 nm, 532 nm, 1064 nm, and at a range of power levels, such as between 4 watts and 50 watts, for example. The laser source 108 and resonator 112 may utilize any suitable technology, including FIBER, DPSS, GREEN, UV and $CO_2$ lasers.

The control system 118 may take the form of a PC, server, or other computing system executing logic or other machine executable instructions which may advantageously improve networked shopping systems. The control system 118 includes one or more processors 306, a system memory 308 and a system bus 310 that couples various system components including the system memory 308 to the processor 306. The control system 118 will at times be referred to in the singular herein, but this is not intended to limit the embodiments to a single system, since in certain embodiments, there will be more than one control system 118 or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 306 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 3 are of conventional design. As a result, such blocks need not be described in further detail herein, as they will be understood by those skilled in the relevant art.

The system bus 310 can employ any known bus structures or architectures. The system memory 308 includes read-only memory ("ROM") 312 and random access memory ("RAM") 314. A basic input/output system ("BIOS") 316, which may be incorporated into at least a portion of the ROM 312, contains basic routines that help transfer information between elements within the control system 118, such as during start-up. Some embodiments may employ separate buses for data, instructions and power.

The control system 118 also may include one or more disk drives 318 for reading from and writing to one or more nontransitory computer- or processor-readable media 320

(e.g., hard disk, magnetic disk, optical disk, flash memory). The disk drive 318 may communicate with the processor 306 via the system bus 310. The disk drive 318 may include interfaces or controllers (not shown) coupled between such drives and the system bus 310, as is known by those skilled in the art. The drives 318 and their associated nontransitory computer- or processor-readable media 320 provide nonvolatile storage of computer-readable instructions, data structures, program modules and other data for the control system 118. Those skilled in the relevant art will appreciate that other types of computer-readable media may be employed to store data accessible by a computer.

Program modules can be stored in the system memory 308, such as an operating system 330, one or more application programs 332, other programs or modules 334, and program data 338.

The application program(s) 332 may include logic capable of providing the functionality described herein. For example, applications programs 332 may implement some or all of the components of the control system shown in FIG. 1.

The system memory 308 may include communications programs 340 that permit the control system 118 to access and exchange data with other networked systems or components.

While shown in FIG. 3 as being stored in the system memory 308, the operating system 330, application programs 332, other programs/modules 334, program data 338 and communications programs 340 can be stored on the nontransitory computer- or processor-readable media 320 or other nontransitory computer- or processor-readable media.

Personnel can enter commands (e.g., system maintenance, upgrades, etc.) and information (e.g., parameters, equations, models, etc.) into the control system 118 using one or more communicably coupled input devices 346 such as a touch screen or keyboard, a pointing device such as a mouse, and/or a push button. Other input devices can include a microphone, joystick, game pad, tablet, scanner, biometric scanning device, gesture detection device, etc. These and other input devices may be connected to the processor(s) 306 through an interface such as a universal serial bus ("USB") interface that couples to the system bus 310, although other interfaces such as a parallel port, a game port or a wireless interface or a serial port may be used. One or more output devices 350, such as a monitor or other display device, may be coupled to the system bus 310 via a video interface, such as a video adapter. In at least some instances, the input devices 346 and the output devices 350 may be located proximate the control system 118, for example when the system is installed at the system user's premises. In other instances, the input devices 346 and the output devices 350 may be located remote from the control system 118, for example when the system is installed on the premises of a service provider.

In some implementations, the control system 118 uses one or more of the logical connections to optionally communicate with one or more remote computers, servers and/or other devices via one or more communications channels, for example, one or more networks 366. These logical connections may facilitate any known method of permitting computers to communicate, such as through one or more LANs and/or WANs. Such networking environments are known in wired and wireless enterprise-wide computer networks, intranets, extranets, and the Internet.

In some implementations, the scan head 114 and the laser source 108 may be coupled to the control system 118 via a control board 368, which may provide real-time control of the scan head and laser source. The control board 368 may be coupled to the control system by a PCI Express, PC104, USB 2.0 bus interface, for example, to provide wide band communication. The control board may be hosted in the control system or placed inside a case of an integrated laser system, for example.

In some implementations, the control board 368 includes a processor, such as a digital signal processor (DSP), or a Field-Programmable-Gate-Array (FPGA), and controls the laser marking process. For example, the control board 368 may generate the coordinates for movement of the scan head mirrors and control the Q-switch frequency and the power level of the laser diode. In some implementations, the control board 368 handles the real-time processing to perform the marking process. Thus, in addition to laser control signals, the control board 368 may also handle I/O controls and axis control.

In some implementations, a network port or interface 356, communicatively linked to the system bus 310, may be used for establishing and maintaining communications over the communications network 366.

In the laser marking system 100, program modules, application programs, or data, or portions thereof can be stored in one or more computing systems. Those skilled in the relevant art will recognize that the network connections shown in FIG. 3 are only some examples of ways of establishing communications between computers, and other connections may be used, including wirelessly. In some embodiments, program modules, application programs, or data, or portions thereof, can even be stored in other computer systems or other devices (not shown).

For convenience, the processor 306, system memory 308, network interface 356 and devices 346, 350 are illustrated as communicatively coupled to each other via the system bus 310, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via intermediary components (not shown). In some embodiments, system bus 310 is omitted and the components are coupled directly to each other using suitable connections.

Figure 4:
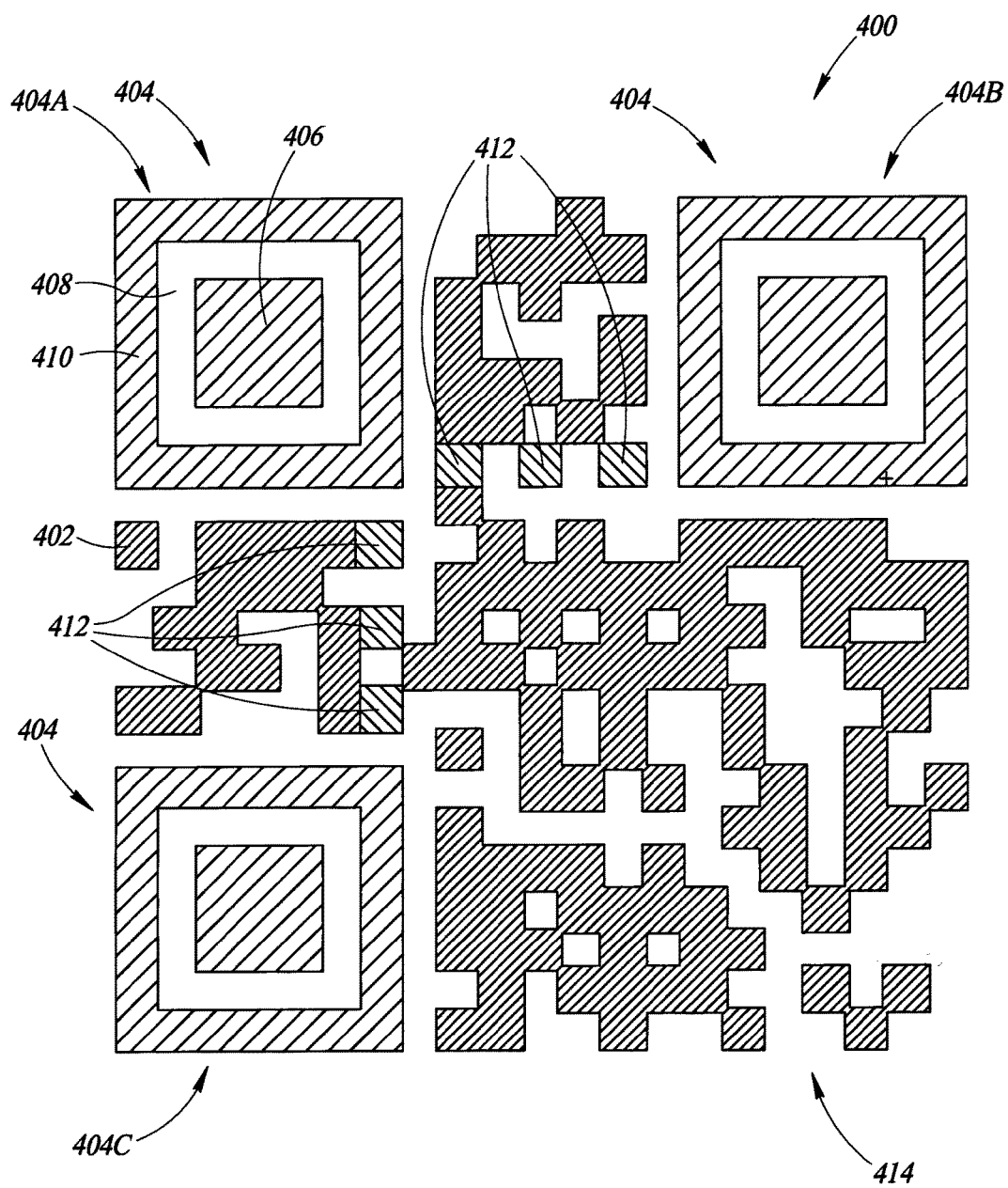
FIG. 4 is a graphical image of a Quick Response (QR) code symbol, according to at least one illustrated embodiment.
Figure 5:
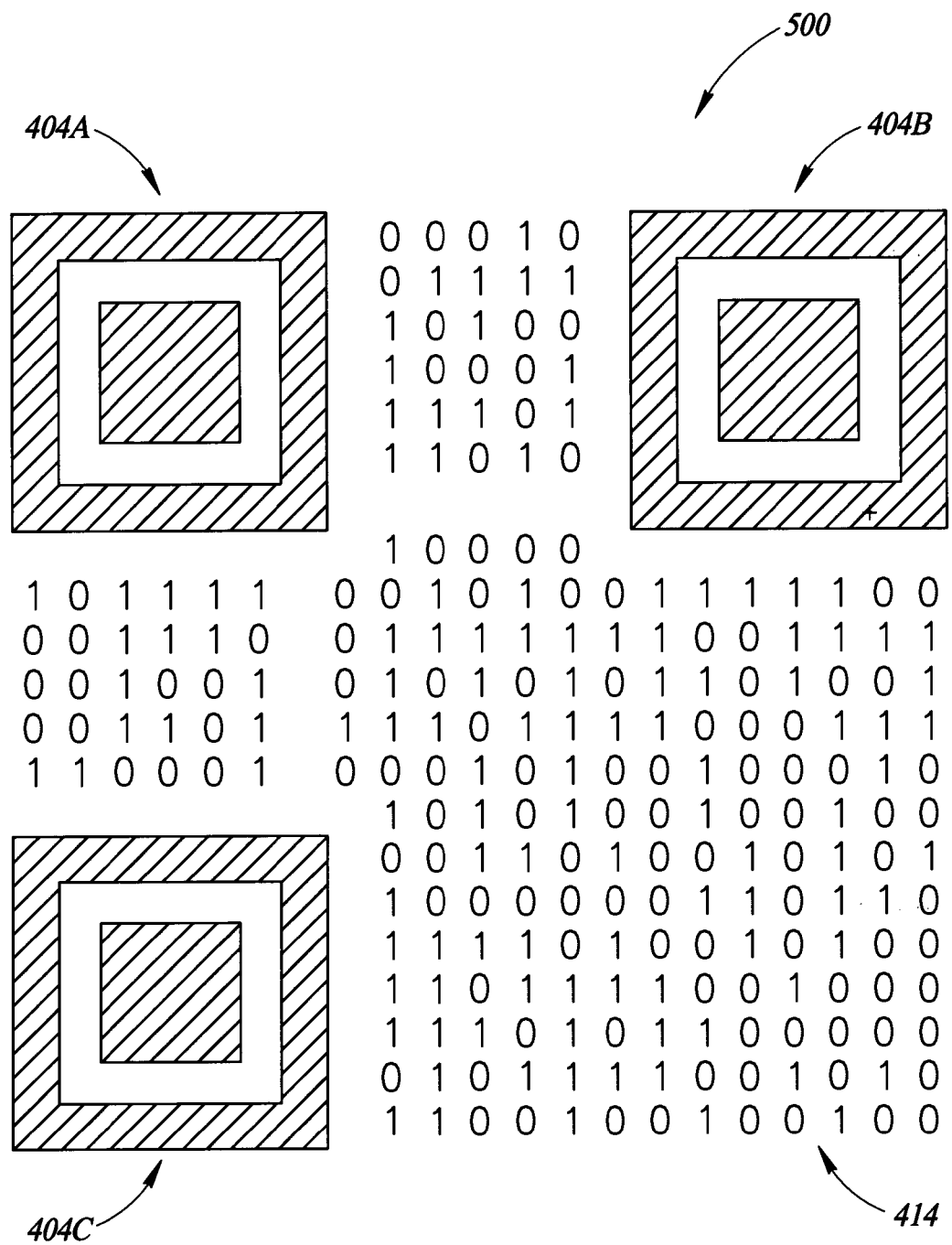
FIG. 5 is a partially decoded bitmap of the QR code symbol of FIG. 4, according to at least one illustrated embodiment.

FIG. 4 illustrates a graphic image 400 of a machine-readable symbol in the form of a QR code symbol which a user intends to mark on a surface of an object, such as the surface 104 of the object 106 of FIG. 1. The image 400 may be stored as a bitmap file, for example, as illustrated in FIG. 5. Although shown in FIG. 4 as including a plurality of shapes of various sizes, the QR code symbol is made up of 441 square modules 402 or cells arranged in a 21×21 matrix.

As shown, the QR code symbol image 400 includes modules that form a finder pattern 404. The finder pattern 404 consists of three identical structures 404A, 404B and 404C that are located in all corners of the QR code except the bottom right corner. Each of the structures 404A, 404B and 404C of the finder pattern 404 is based on a 3×3 matrix of dark modules 406 surrounded by light modules 408 that are again surrounded by dark modules 410. The finder pattern 404 enables decoder software to recognize the QR code and to determine the correct orientation for the code.

The QR code symbol 400 also includes modules that form a timing pattern 412. The timing pattern 412 includes alternating black and white modules that enable decoder software to determine the size of a single module. The QR code symbol 400 may also include separator patterns, which are white separators having a width of one module that improve the recognizability of the finder patterns as they separate them from the actual data.

The QR code symbol 400 also includes data region modules 414 that form payload data and, in some instances, error correction data. The payload data may be converted into a bit stream and then stored (e.g., in 8 bit code words) in the data region 414, for example.

FIG. 5 shows a bitmap view 500 of the image 400 of FIG. 4 after the payload data region 414 of the QR code symbol has been partially decoded and stored, for example, as a bitmap file. In the bitmapped two dimensional code, "1" and "0" correspond respectfully to an irradiated module (e.g., "black module") and a non-irradiated module (e.g., "white module"). The laser marking control system 118 may use the bitmapped data to generate laser marking data (e.g., laser beam path) for use by the laser marking system 100 to mark a surface of an object with the machine-readable symbol depicted in the image of FIG. 4.

Figure 6:
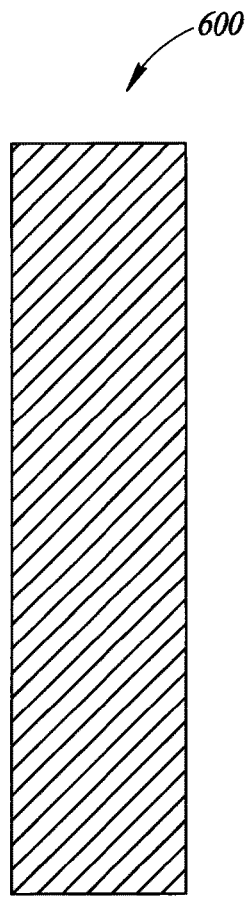
FIG. 6 is a graphical image of a portion of a machine-readable symbol, according to at least one illustrated embodiment.

FIG. 6 illustrates a graphical image 600 of a portion of a machine-readable symbol which a user intends to mark on a surface of an object. As an example, the graphical image 600 may be a 1×6 column of dark (e.g., black) modules of a two dimensional machine-readable symbol, such as the QR code image 400 shown in FIG. 4.

Figure 7:
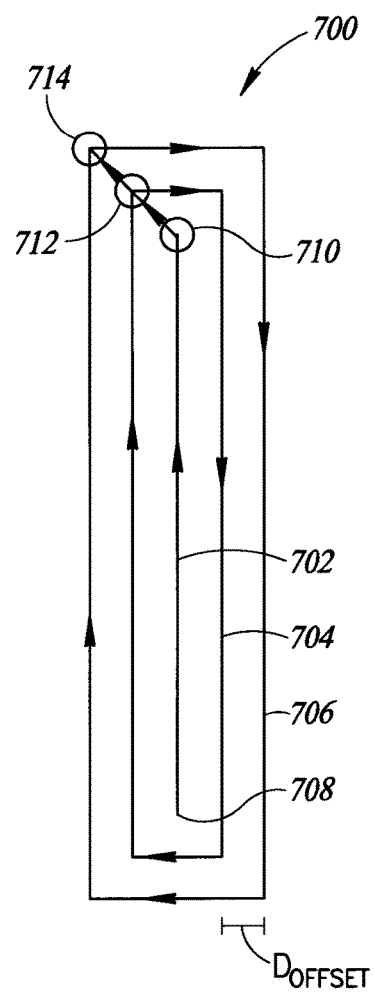
FIG. 7 shows an example of a laser beam path that may be traversed by a laser beam to mark the graphical image of FIG. 6 onto a surface of an object, according to at least one illustrated embodiment.

FIG. 7 shows a laser beam path or fill pattern 700 usable by a laser to mark the graphical image 600 of FIG. 6 on a surface of an object. A graphics application executing on the laser marking control system 118 may generate the fill pattern, which includes contour path lines 702, 704 and 706 that may be followed by a laser beam to fill the dark area of the original image 600. The path lines 702, 704 and 706 may be spaced from each other by a selectable offset distance ($D_{OFFSET}$), which is typically significantly smaller than size of a module of a machine-readable symbol. Generally, the path lines 702, 704 and 706 may be spaced close together such that the dark area of the original image 600 appears substantially solid, or is at least readily distinguishable from a light area of a machine-readable symbol by a machine-readable symbol reader. When the path lines 702, 704 and 706 are relatively close to each other, more laser power is delivered to the surface and the marking process takes a relatively longer amount of time. Conversely, when the path lines 702, 704 and 706 are spaced relatively far from each other, less laser power is delivered to the surface and the marking process takes a relatively shorter amount of time.

The contour path lines 702, 704 and 706 define a laser beam path to be traversed by a laser of a laser marking system. In some implementations of the present disclosure, the laser is directed to traverse the innermost path line 702 or shape of a contour pattern first, then to traverse progressively larger path lines or shapes (e.g., path line 704) until the outer boundary path line 706 is traversed. In the example shown in FIG. 7, the laser may be directed to begin at a starting point 708 at a bottom end the innermost path line 702. The laser may traverse the innermost path line 702 upward until reaching a top end 710 of the inner path line. At the top end 710 of the path line 702, the laser may be directed to "jump" (i.e., move with the laser turned off) to a top-left corner 712 of the middle path line 704 and then traverse the middle path line. After traversing the middle path line 704, the laser is directed to jump from the top-left corner 712 of the middle path line to a top-left corner 714 of the outer boundary path line 706 and then to traverse the outer boundary path line. As noted above, by iteratively proceeding from inner lines or shapes to outer lines or shapes, residual material is removed or cleaned from the area marked on the surface of the object.

Figure 8:
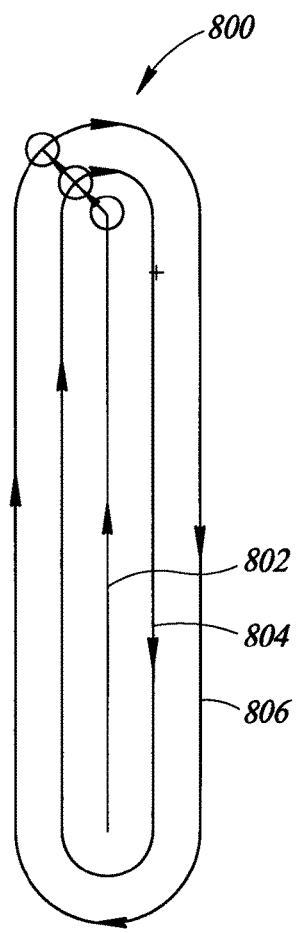
FIG. 8 shows another example of a laser beam path that may be traversed by a laser beam to mark the graphical image of FIG. 6 onto a surface of an object, the laser beam path approximating corners of the graphical image to reduce marking time, according to at least one illustrated embodiment.

FIG. 8 shows another example of a laser beam path 800 usable by a laser to mark the graphical image 600 of FIG. 6 on a surface of an object. In this example, the rectangular shape of the graphical image 600 has been approximated using rounded contour path lines 802, 804 and 806. Laser marking systems are able to traverse rounded shapes faster than shapes with sharp edges (e.g., rectangles), so the rounded path lines 802, 804 and 806 may be used to reduce the time required for the marking process. In the illustrated example of FIG. 8, a laser may be directed to first traverse the inner path line 802, then to jump to and traverse the middle path line 804, then to jump to and traverse the outer boundary path line 806.

Figure 9:
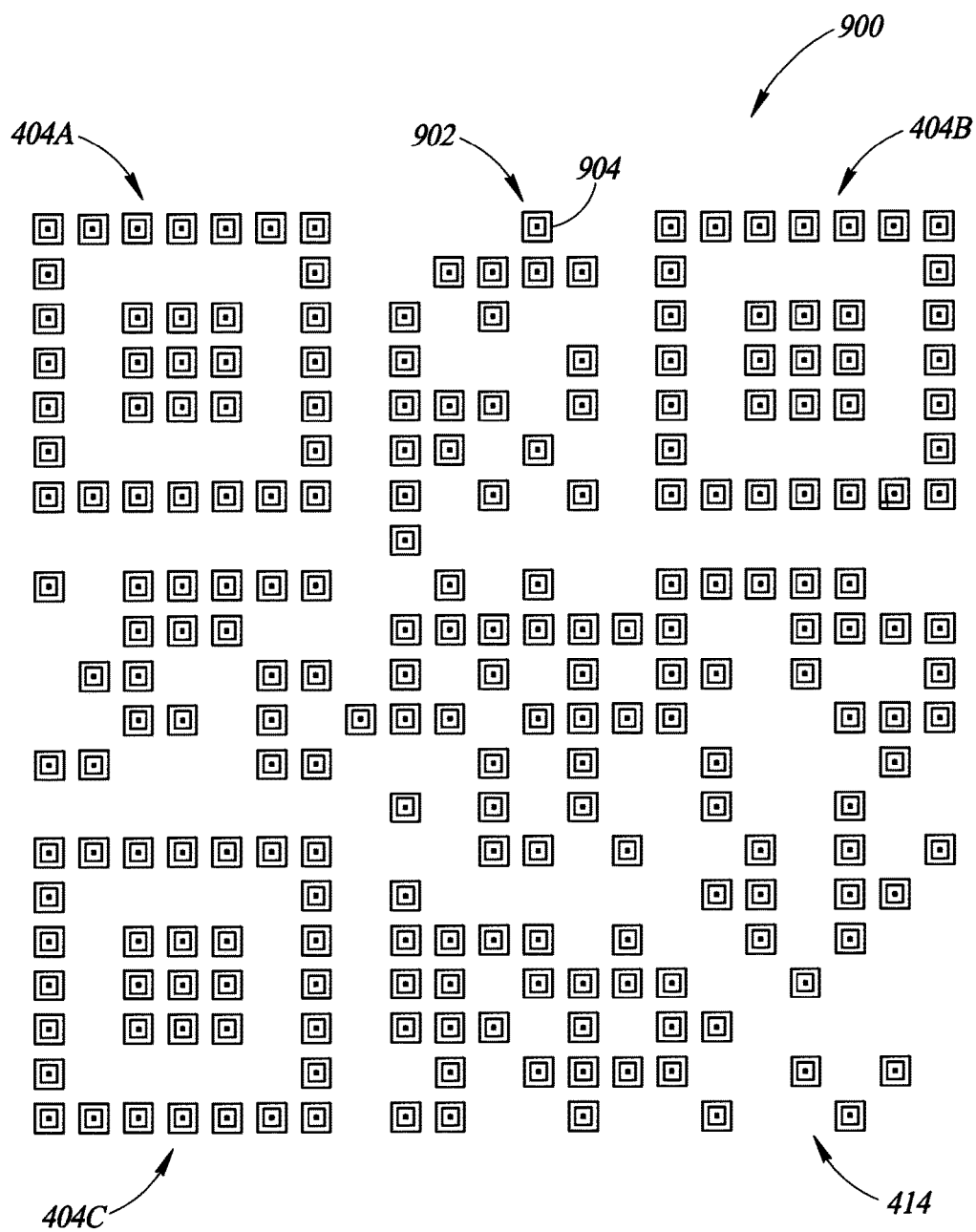
FIG. 9 shows an example of a laser beam path that may be traversed by a laser beam to mark the QR code symbol of FIG. 4, wherein each module of the symbol is treated as a bounded area or island, according to at least one illustrated embodiment.

FIG. 9 shows a laser beam path 900 for marking the QR code symbol 400 of FIG. 4 on a surface of an object. As shown, each dark module 902 of the QR code symbol is treated as a separate block or island having a contour fill pattern 904. In the illustrated example, each module 902 is defined by an innermost square-shaped path line, a middle square-shaped path line surrounding the innermost path line, and an outermost boundary path line surrounding the middle path line. A laser may be directed to successively traverse the contour fill patterns for each of the modules from the innermost path line to the outermost path line, as described above.

Figure 10:
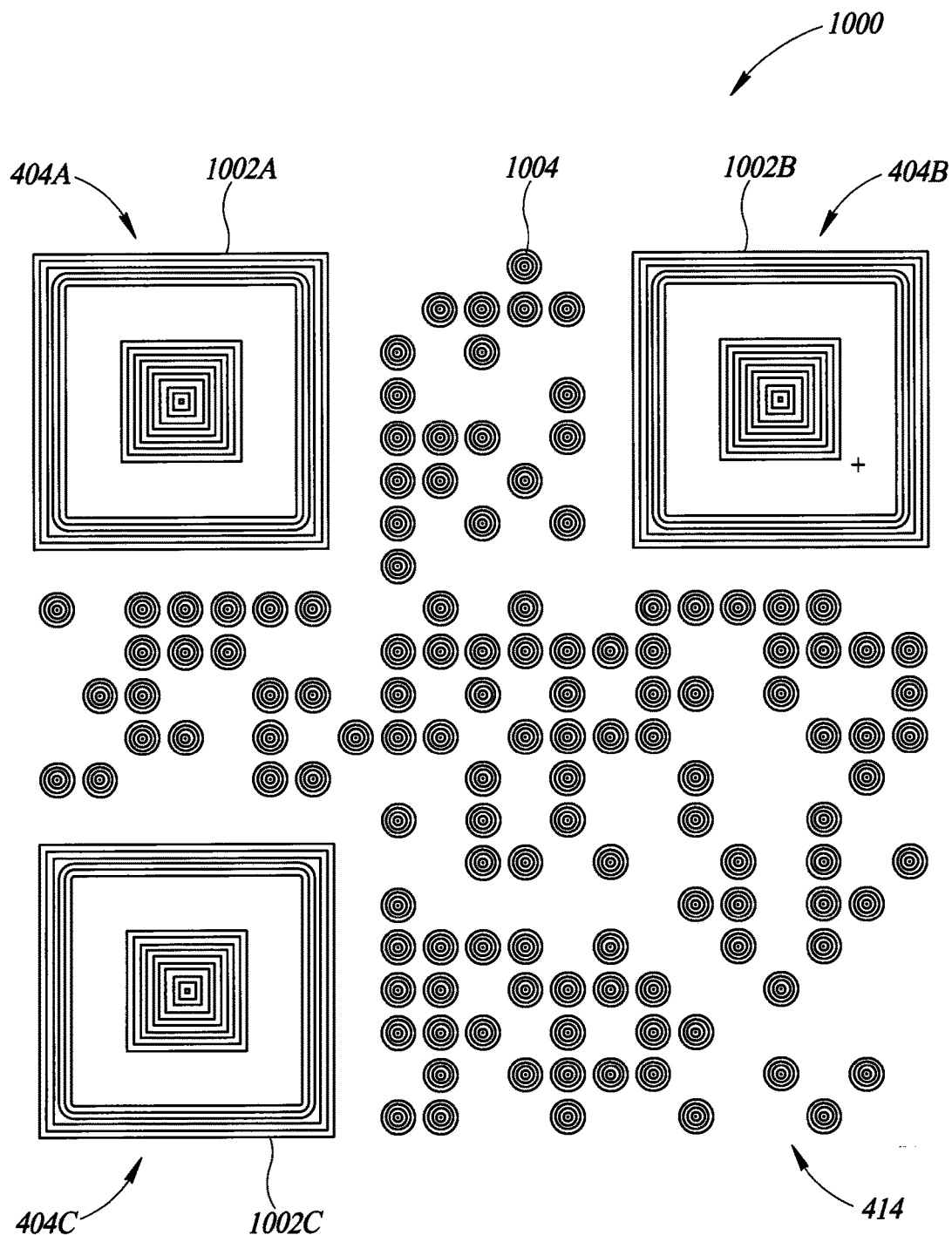
FIG. 10 shows an example of a laser beam path that may be traversed by a laser beam to mark the QR code symbol of FIG. 4, wherein finder patterns of the symbol are treated as individual bounded areas and modules not part of the finder patterns are treated as individual bounded areas that are approximated using circular contour fill lines, according to at least one illustrated embodiment.

FIG. 10 shows another laser beam path 1000 for marking the QR code symbol 400 of FIG. 4 on a surface of an object. In this example, the modules of each of the finder patterns 404A-404C have been grouped together as single blocks or islands 1002A, 1002B and 1002C, respectively. Thus, rather than generating a separate contour fill pattern for each of the individual modules that forms the finder patterns as done in the implementation of FIG. 9, one contour fill pattern is generated for the entire finder pattern structure 404A. Similarly, the modules that make up the finder pattern structure 404B are grouped together in a single island 1002 having a contour fill pattern, and the modules that make up the finder pattern structure 404C are grouped together in a single island 1002C having a contour fill pattern. To fill one of the islands 1002A-1002C, a laser may be directed to begin at an innermost path line and to progressively traverse surrounding path lines until an outermost path line has been traversed. The laser may then jump to another block or island to be filled.

In the example of FIG. 10, the square modules that are not part of one of the finder patterns are filled using circular shaped contour path lines 1004 rather than square shaped contour path lines (FIG. 9). As noted above, a laser may be able to traverse rounded paths more rapidly than paths with sharp corners, so using the circular shaped contour path lines 1004 may reduce the time required for marking a surface of an object.

Figure 11:
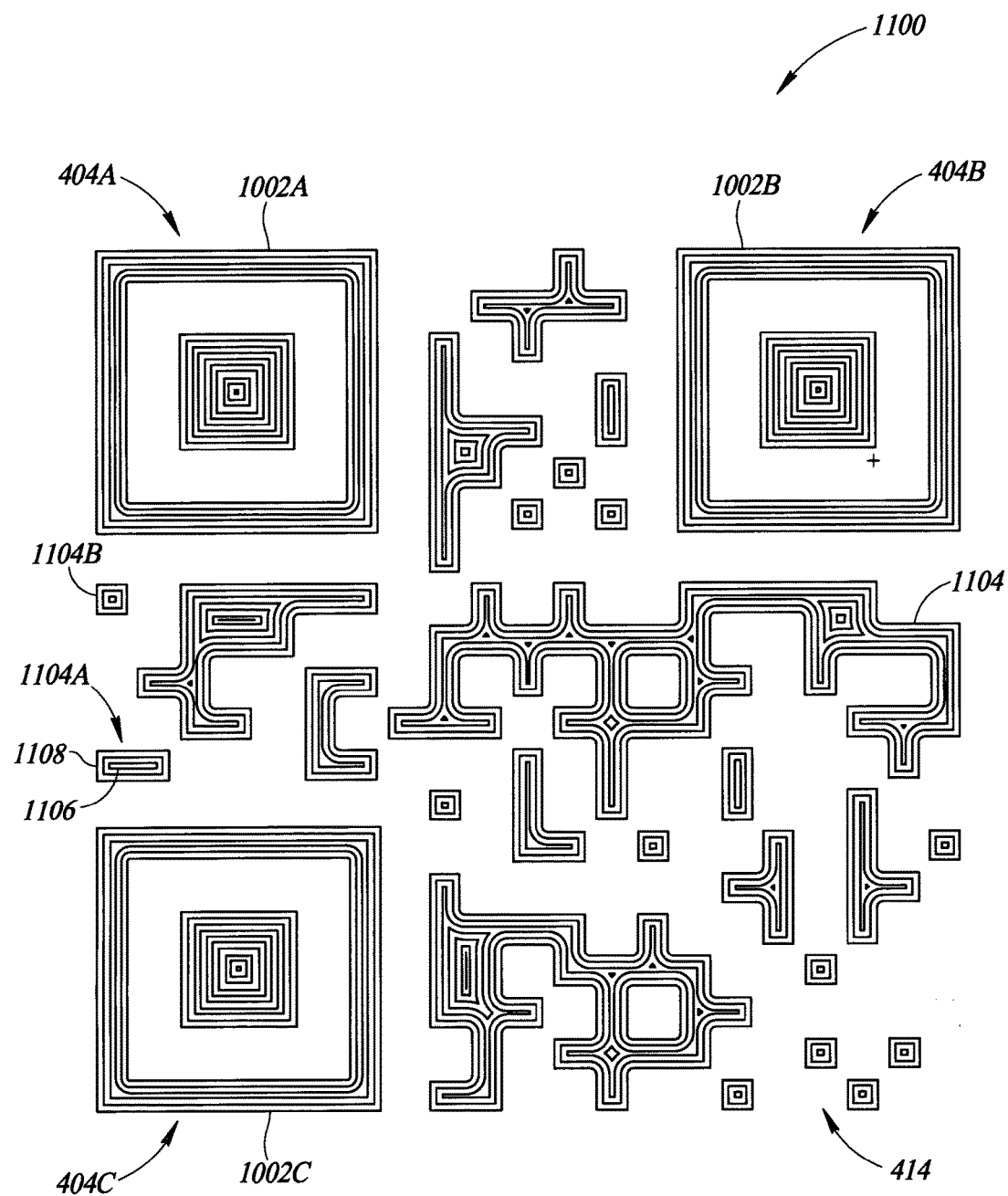
FIG. 11 shows an example of a laser beam path that may be traversed by a laser beam to mark the QR code symbol of FIG. 4, wherein finder patterns of the symbol are treated as individual bounded areas and modules not part of the finder patterns are grouped together according to adjacency, according to at least one illustrated embodiment.

FIG. 11 shows another laser beam path 1100 for marking the QR code symbol 400 of FIG. 4 on a surface of an object. As with the beam path 1000 shown in FIG. 10, the modules forming each of the finder patterns 404A-404C have been grouped together as single blocks or islands 1002A-1002C, respectively. Additionally, in this implementation the square modules that are not part of one of the finder patterns 404A-404C are grouped by adjacency into a plurality of bounded blocks or islands 1104 that each include one or more modules. Contour lines are generated for each of the plurality of islands 1104. As discussed above, for each island 1104, a laser may traverse an innermost path line (e.g., path line 1106 of island 1104A) and progressively jump toward outer path lines until an outermost path line (e.g., path line 1108 of island 1104A) is reached. Then, the laser may jump to another island (e.g., from island 1104A to island 1104B) to be filled and repeat the process until all islands 1104 have been filled.

Figure 12:
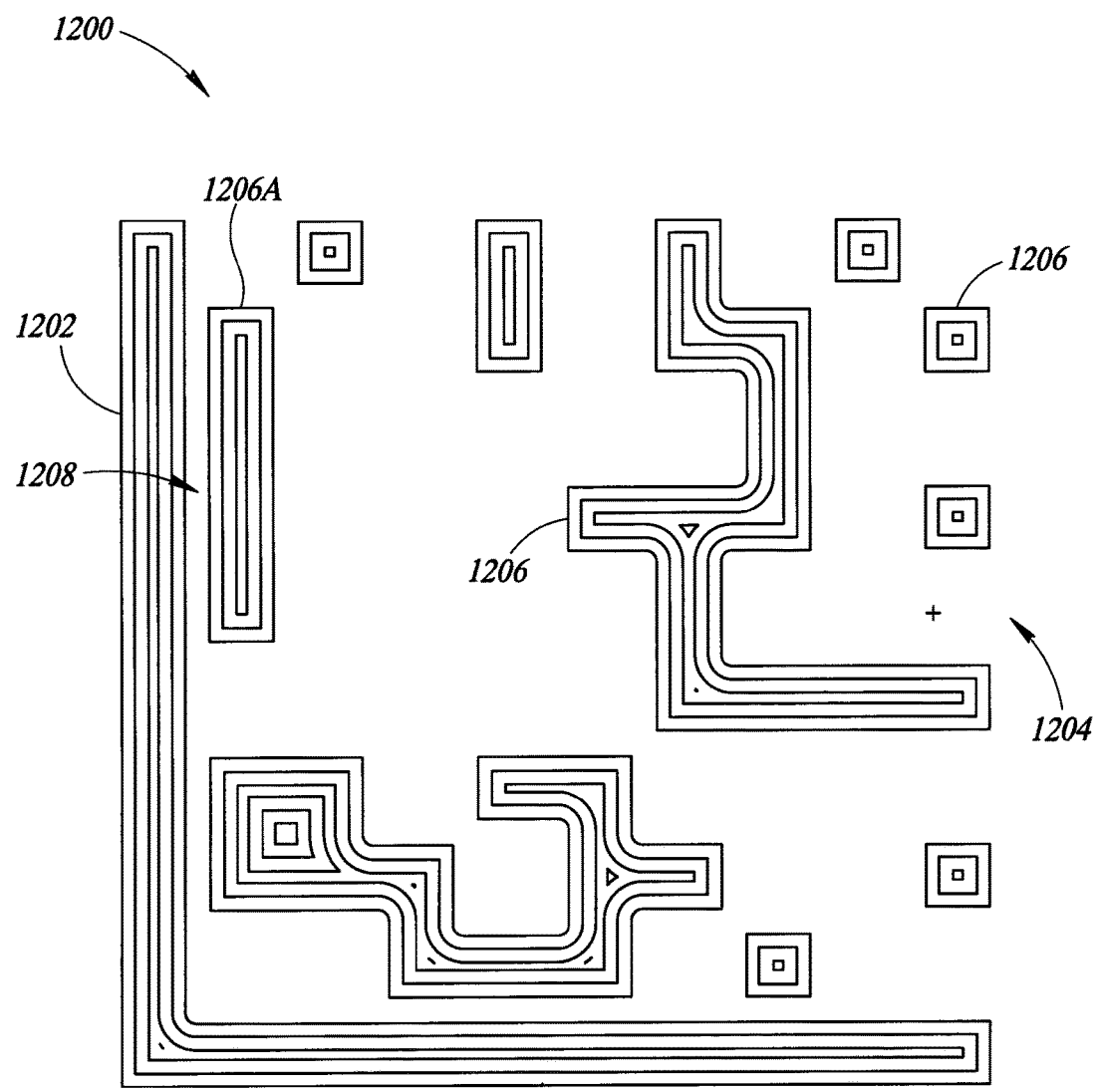
FIG. 12 shows an example of a laser beam path that may be traversed by a laser beam to mark a Data Matrix code symbol, wherein a finder pattern of the symbol is treated as a single bounded area and modules not part of the finder pattern are grouped together according to adjacency, according to at least one illustrated embodiment.

FIG. 12 shows a laser beam path 1200 for a Data Matrix code symbol. In this implementation, modules forming an L-shaped finder pattern are grouped into a single block or island 1202. Modules in a data area or region 1204 (i.e., outside the finder pattern area or region) of the Data Matrix symbol are grouped into bounded blocks or islands 1206 according to adjacency. Note that since the modules of the finder pattern are grouped separately from the modules outside the finder pattern, modules forming a "data island" (e.g., island 1206A) are not grouped with modules forming the finder pattern island 1202 even though modules in the two islands are adjacent each other (e.g., adjacent at the point indicated by an arrow 1208). By marking the finder pattern as a combined block rather than as individual modules or cells, a machine-readable symbol reader is more easily able to isolate the finder pattern.

Figure 13:
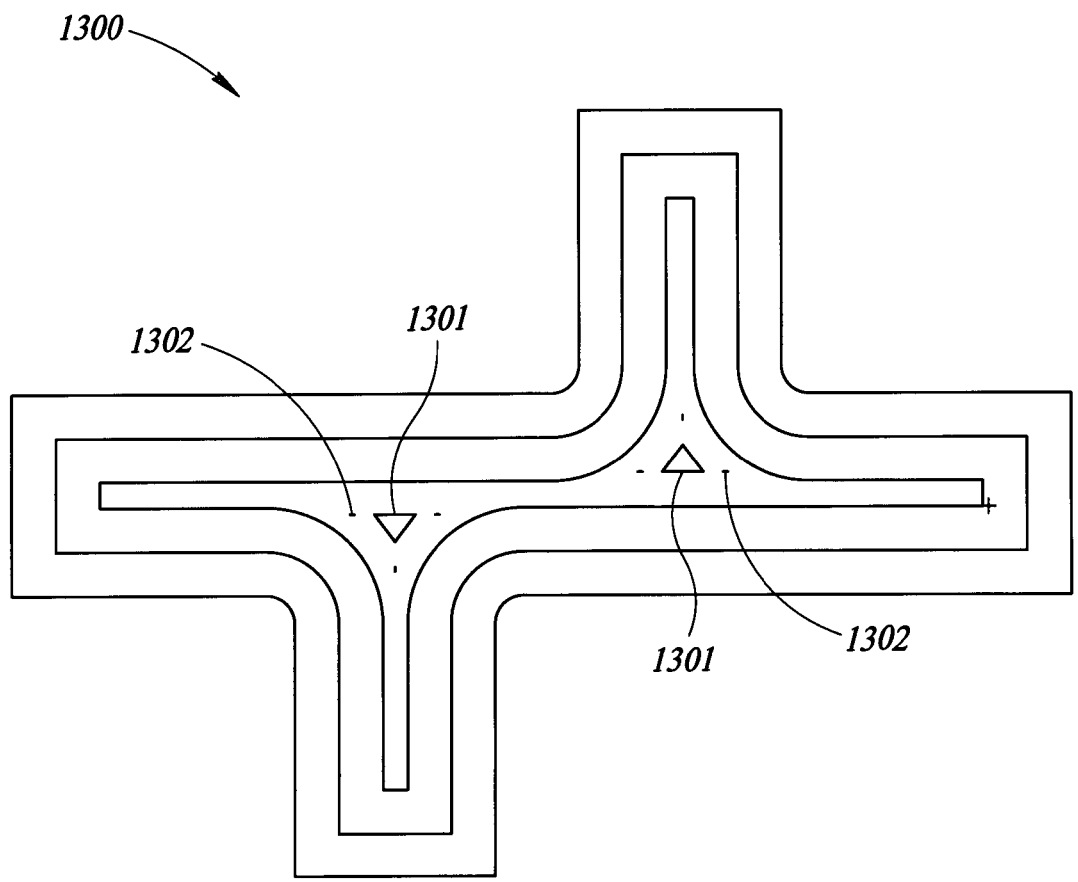
FIG. 13 shows an example of a laser beam path defined by a contour fill pattern, wherein dot vectors are inserted into spaces where contour lines are separated from each other by more than an offset distance, according to at least one illustrated embodiment.

As shown in FIG. 13, if joining multiple adjacent modules together results in an irregular shaped island 1300, the internal path lines or shapes 1301 may result in an offset greater than the user selected offset distance. In such cases, the greater space between path lines may result in a lighter marking in those areas. To correct for such spaces, in some implementations dot vectors 1302 are inserted into the spaces to fill the locations of the larger spaces or gaps.

Figure 14:
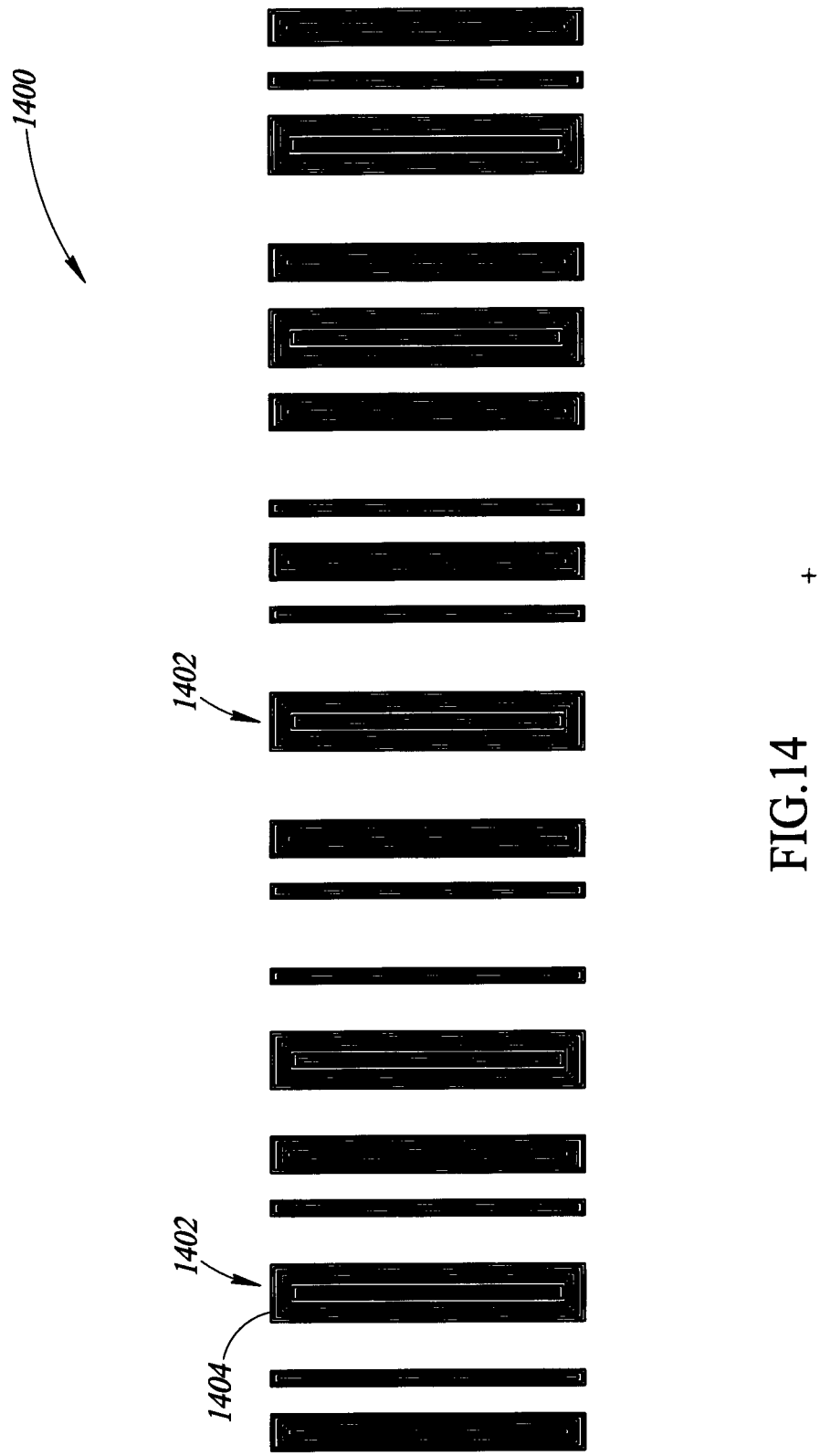
FIG. 14 shows an example of a laser beam path that may be traversed by a laser beam to mark a one-dimensional barcode symbol, according to at least one illustrated embodiment.
Figure 15:
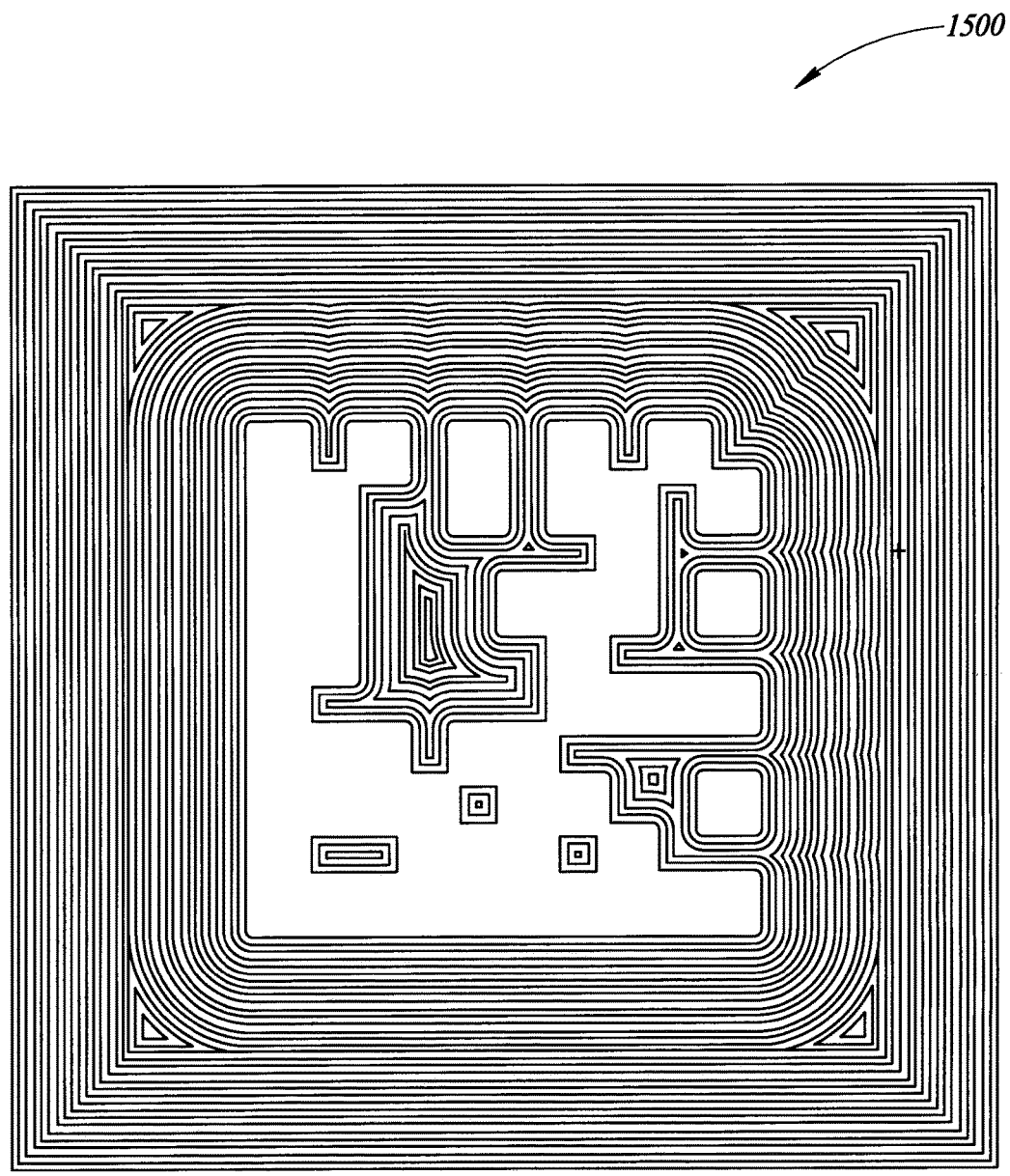
FIG. 15 shows an example of a laser beam path that may be traversed by a laser beam to mark a reverted or inverse Data Matrix code symbol, according to at least one illustrated embodiment.
Figure 16:
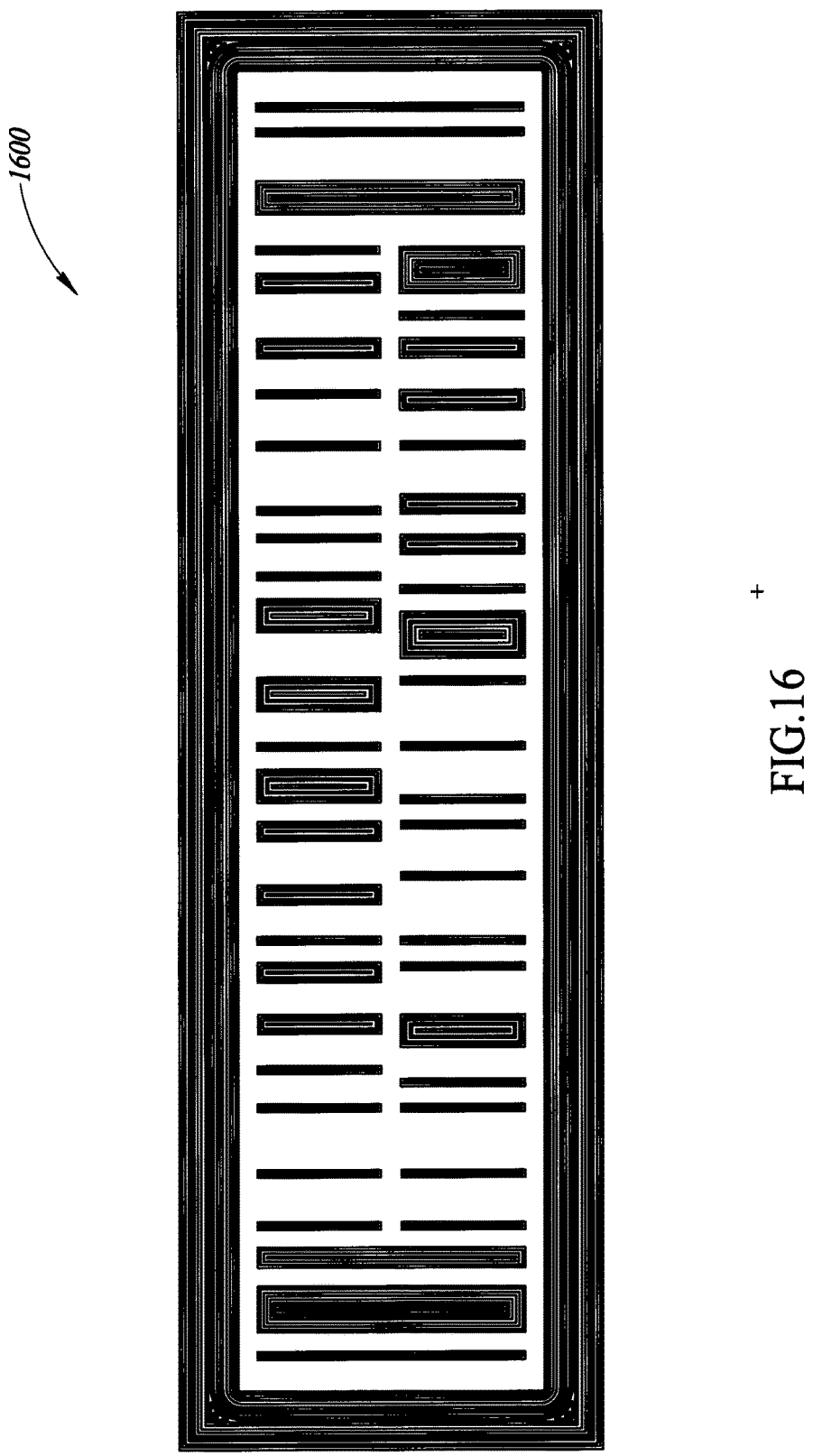
FIG. 16 shows an example of a laser beam path that may be traversed by a laser beam to mark a Codablock F reverted code with a contour fill pattern applied globally, according to at least one illustrated embodiment.

FIGS. 14-16 show example contour fill patterns for various types of machine-readable symbols. In particular, FIG. 14 shows a contour fill pattern 1400 for a one-dimensional barcode, such as an EAN-13 barcode. In this illustration, each of the dark bars or modules 1402 of the barcode is treated as a separate island having contour fill lines 1404. In this instance, the modules 1402 cannot be grouped with an adjacent module, but each single module may be marked faster compared to standard bidirectional hatching due to the shorter path and fewer, shorter jumps. Further, if high speed is required, the modules 1402 of the one-dimensional barcode may be approximated by rounded shapes, as illustrated in FIG. 8 and discussed above.

FIG. 15 shows a contour fill pattern 1500 for a reverted or inverse Data Matrix code. FIG. 16 shows a contour fill pattern 1600 for a stacked bar code, namely, a Codablock F reverted code with a contour fill applied globally (including the quiet zone).

Figure 17:
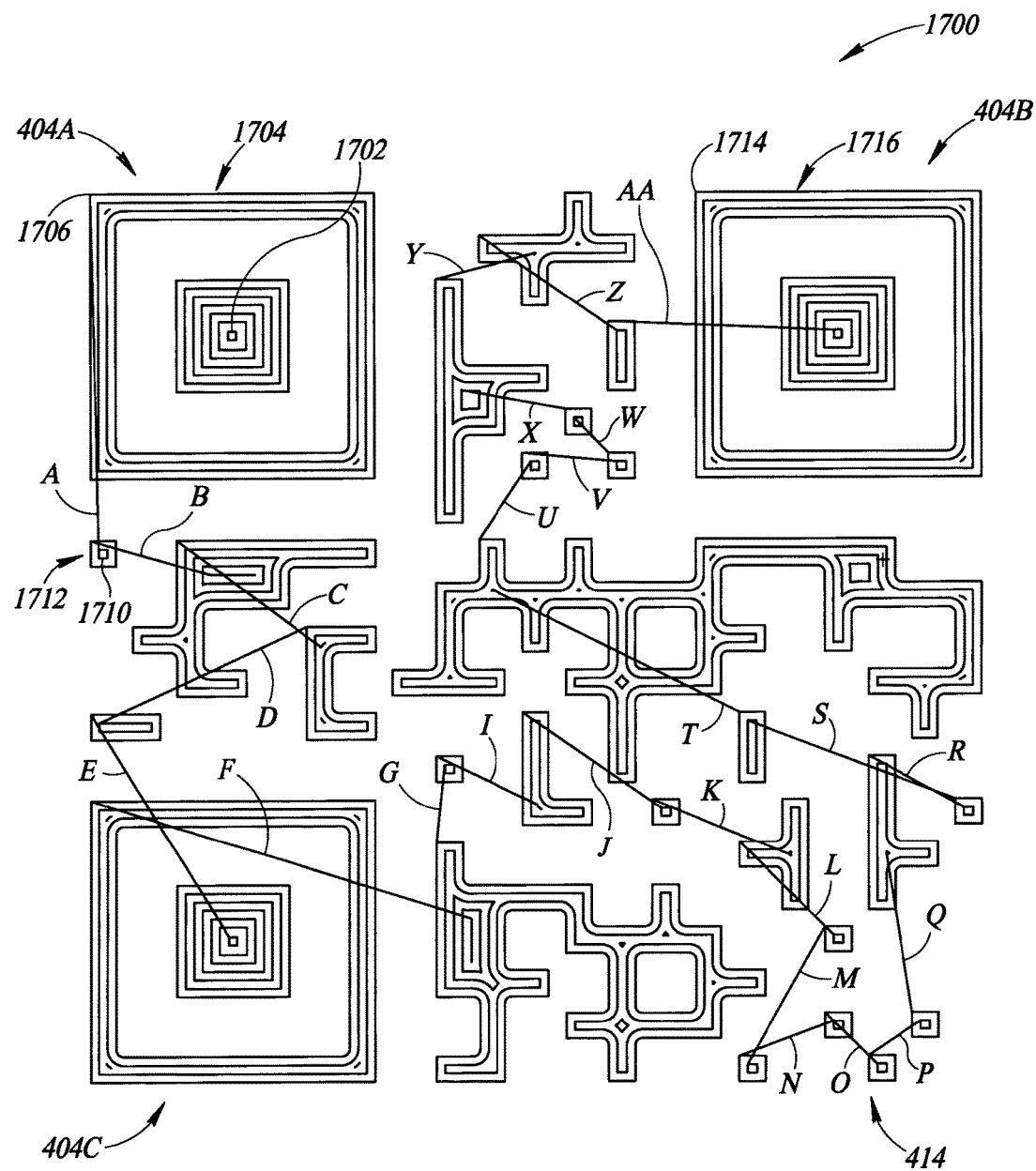
FIG. 17 shows an example of a laser beam path that may be traversed by a laser beam to mark the QR code symbol of FIG. 4, and shows example movements or jumps by the laser from one bounded area or island to a subsequent bounded area or island, according to at least one illustrated embodiment.

FIG. 17 shows an example laser beam path 1700 for traversing the blocks or islands of FIG. 11 to mark a surface of an object with the QR code symbol 400 of FIG. 4. The order in which the plurality of islands is marked may have a significant impact on the time required to generate the mark. As discussed above, each island is preferably marked from an innermost path line to an outermost path line to remove residue formed by the marking process. Generally, for each island, the laser beam path starts at a top-left corner of an innermost path line and successively traverses surrounding path lines until the laser reaches a top-left corner of an outermost path line of the island. Then, the laser jumps to a top-left corner of an innermost path line of another island, and repeats the process until all islands have been filled.

In the implementation of FIG. 17, distances between one island's end point and a next island's start point are reduced or minimized. For example, this is accomplished by utilizing top-left corners of an innermost path line as an island's start point, while end points of the islands are top-left corners of an outermost path line.

In particular, the laser beam path may begin at a top-left corner of an innermost path line 1702 of an island 1704 that corresponds to the top-left finder pattern structure 404A. The laser beam path progressively traverses surrounding path lines of the island 1704, jumping to a surrounding path line at each top-left corner, until the laser has traversed the outermost path line 1706. The laser beam then makes a jump "A" from the top-left corner of the outermost path line 1706 of the island 1704 to a top-left corner of an innermost path line 1710 of another bounded island 1712. This process continues through jumps (labeled "B" to "AA") to the remainder of the islands until the laser beam path ends at a top-left corner of the outermost path line 1714 of an island 1716 that corresponds to the finder pattern structure 404B in the top-right corner of the QR code symbol.

Figure 18:
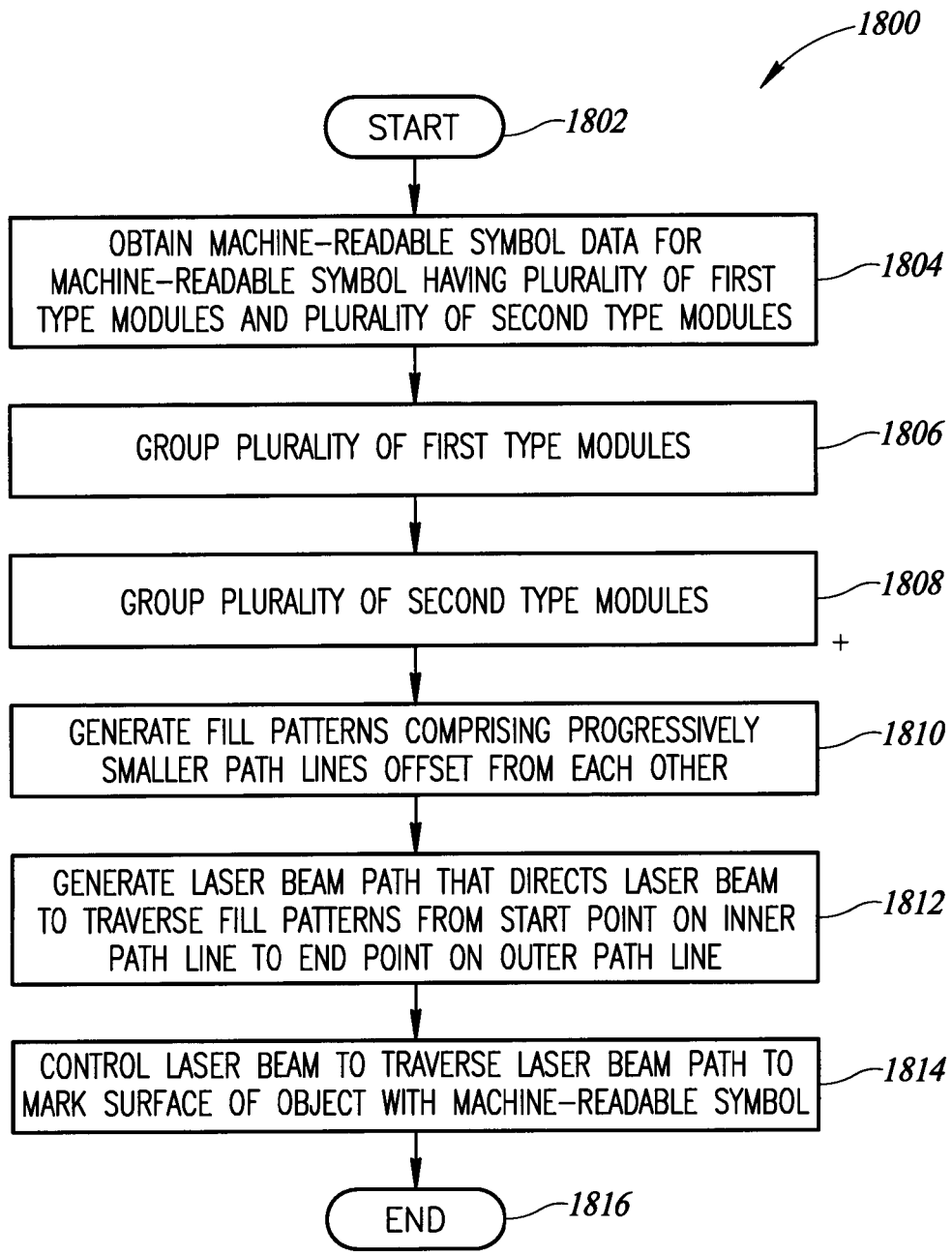
FIG. 18 is a flow diagram showing a method of operation of a laser marking system to mark a surface of an object with a machine-readable symbol using a laser, according to at least one illustrated embodiment.

FIG. 18 shows a method 1800 of operating a laser marking system, such as the laser marking system 100 of FIG. 1, according to one illustrated embodiment. Notably, the approach described herein provides an improved laser marking system that allows for fast and reliable marking of machine-readable symbols directly onto surfaces of objects.

The method 1800 begins at 1802. For example, the method 1800 may begin when a user starts a computer-aided design (CAD) application, a computer-aided manufacturing (CAM) application, or a graphics application executing on a processor-based device, such as a laser marking control system.

At 1804, the processor-based device obtains machine-readable symbol data representative of a machine-readable symbol. For example, the machine-readable symbol data may be a digital image of a machine-readable symbol or a bitmapped representation of a machine-readable symbol. In some implementations, the processor-based device may obtain encodable data as input, and then may generate the machine-readable symbols from the data to be encoded. As discussed above, the machine-readable symbol may include a plurality of first type modules that collectively encode information of a first type (e.g., payload data). The machine-readable symbol may also include a plurality of second type modules that collectively encode information of a second type (e.g., non-payload data such as a finder pattern or timing pattern).

At 1806, the processor-based device may group the plurality of first type modules into one or more first type bounded areas or islands that each include a continuous outer boundary. For example, the processor-based device may group adjacent payload data modules together to form a plurality of bounded areas or islands. As another example, the processor-based device may group a number N payload data modules into the number N bounded areas such that each payload data module is treated as an individual bounded area (see FIG. 10).

Similarly, at 1808, the processor-based device may group the plurality of second type modules into one or more second type bounded areas that each include a continuous outer boundary. For example, the processor-based device may group a number N2 of second type modules into a number N3 of second type bounded areas, the number N3 being less than the number N2. For example, the processor-based device may group each of the modules associated with a finder pattern together into a single bounded area. Furthermore, the processor-based device may also group each of the modules associated with a timing pattern together into a single bounded area.

At 1810, the processor-based device may generate a bounded area fill pattern for each bounded area of the one or more first type bounded areas and second type bounded areas. Each of the bounded areas may include an outer boundary path line corresponding to the outer boundary of the bounded area and progressively smaller path lines offset from each other. In some implementations, the path lines are offset from each other by a user selectable offset distance, which generally may be smaller than a module size of the machine-readable symbol. In some implementations, sharp corners of a bounded area may be approximated as rounded corners to reduce the time required for marking. At 1812, the processor-based device may generate a laser beam path that directs a laser beam to traverse the bounded area fill pattern for each of the first type bounded areas and the second type bounded areas. The laser beam path may direct a laser to, for each bounded area or island, traverse each of the path lines of the bounded area fill pattern from a start point on a starting path line to an end point on an ending path line. Preferably, the start point is on an inner path line and the end point is on the outer boundary path line. In some implementations, the order in which each of the bounded areas is traversed is optimized to reduce or minimize the time required for marking. In some implementations, for each bounded area fill pattern the processor-based device sets the start point on the inner path line at a directional corner (e.g., top left corner) and sets the end point on the outer boundary path line at the directional corner.

At 1814, the processor-based device controls a laser beam of a laser marking system to traverse the generated laser beam path to mark a surface of an object with the machine-readable symbol. Act 1814 may be repeated for each object to be marked with the machine-readable symbol.

The method 1800 ends at 1816 until started or invoked again. For example, the method 1800 may be invoked each time a laser beam path is to be generated to mark a machine-readable symbol on a surface of an object using a laser marking system.

Machine-readable symbols are often made of well-known shapes (e.g., squares, rectangles). In some implementations, a filling algorithm may be highly optimized to avoid general-purpose island calculations in favor of predetermined island shapes, which may offer a significant advantage to generate a fill path. The path may also be optimized for speed according to the capabilities of an intended machine-readable symbol reader by, for example, using rounded islands instead of squared islands, as shown in FIG. 10.

Implementations of the present disclosure provide improved laser marking systems by using contour filling which creates a pattern of growing shapes modeled as the outline of a single module or group of modules of a machine-readable symbol. Such functionality allows for fast fill or area marking and more flexible techniques which allow marking in shapes resulting from a group of adjacent modules. Marking more modules together as groups has been found to greatly enhance the ability of machine-readable symbol readers to detect orientation or finder patterns of machine-readable symbols (e.g., 2D codes).

Further, filling groups of adjacent modules together as islands with contours results in a much faster marking process, due to the longer strokes used and a reduction of the number of jumps required from one stroke to the next stroke.

The techniques described herein may also provide better integration by allowing for simple "shaving" of the single module or the group of modules to compensate for expanding effects with the laser-material interaction. For example, the techniques described herein may be used to generate islands of any shape and are not limited to simple shapes (e.g., squares, rectangles, hexagons).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof and that designing the circuitry and/or writing the code for the software and/or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a machine-readable symbol laser marking system including at least one processor having at least one nontransitory processor-readable medium communicatively coupled to the at least one processor and which stores at least one of processor-executable instructions or data, the method comprising:

obtaining, by the at least one processor, machine-readable symbol data representative of a machine-readable symbol, the machine-readable symbol having a plurality of first type modules that collectively encode information of a first type and a plurality of second type modules that collectively encode information of a second type, the information of a second type different from the information of a first type;

grouping, by the at least one processor, the plurality of first type modules into one or more first type bounded areas, each first type bounded area including a continuous outer boundary;

grouping, by the at least one processor, the plurality of second type modules into one or more second type bounded areas, each second type bounded area including a continuous outer boundary;

for each bounded area of the one or more first type bounded areas and second type bounded areas, generating, by the at least one processor, a bounded area fill pattern comprising an outer boundary path line corresponding to the outer boundary of the bounded area and progressively smaller path lines offset from each other; and generating, by the at least one processor, a laser beam path that directs a laser beam to traverse the bounded area fill pattern for each of the first type bounded areas and the second type bounded areas by, for each bounded area, traversing each of the path lines of the bounded area fill pattern from a start point on a starting path line to an end point on an ending path line.

2. The method of claim 1 wherein generating a laser beam path comprises generating a laser beam path that directs a laser beam to successively traverse the bounded area fill pattern for each of the first type bounded areas and the second type bounded areas in a determined order.

3. The method of claim 2 wherein generating a laser beam path comprises generating a laser beam path that directs a laser beam to be turned off when moved from an end point of one bounded area fill pattern to a start point of a subsequently traversed bounded area fill pattern.

4. The method of claim 1 wherein obtaining machine-readable symbol data representative of a machine-readable symbol comprises obtaining machine-readable symbol data representative of a machine-readable symbol, the machine-readable symbol having a plurality of payload data modules that collectively encode payload information and a plurality of non-payload modules that collectively encode non-payload information.

5. The method of claim 1 wherein the information of the first type comprises payload data information and the information of the second type comprises non-payload information.

6. The method of claim 1, further comprising:
controlling, by the at least one processor, a laser beam to traverse the laser beam path to mark a surface of an object with the machine-readable symbol, wherein controlling a laser beam to traverse the laser beam path to mark an object with the machine-readable symbol comprises altering an optical characteristic of the object with the laser beam.

7. A laser marking path generation system, comprising:
at least one processor; and
at least one nontransitory processor-readable medium communicatively coupled to the at least one processor and which stores at least one of processor-executable instructions or data that when executed by the at least one processor of the laser marking path generation system, cause the at least one processor to:
obtain machine-readable symbol data representative of a machine-readable symbol, the machine-readable symbol having a plurality of first type modules that collectively encode information of a first type and a plurality of second type modules that collectively encode information of a second type;

group the plurality of first type modules into one or more first type bounded areas, each first type bounded area including a continuous outer boundary;

group the plurality of second type modules into one or more second type bounded areas, each second type bounded area including a continuous outer boundary;

for each bounded area of the one or more first type bounded areas and second type bounded areas, generate a bounded area fill pattern comprising an outer boundary path line corresponding to the outer boundary of the bounded area and progressively smaller path lines offset from each other; and generate a laser beam path that directs a laser beam to traverse the bounded area fill pattern for each of the first type bounded areas and the second type bounded areas by, for each bounded area, traversing each of the path lines of the bounded area fill pattern from a start point on a starting path line to an end point on an ending path line.

8. The system of claim 7 wherein the at least one processor:
generates a laser beam path that directs a laser beam to successively traverse the bounded area fill pattern for each of the first type bounded areas and the second type bounded areas in a determined order.

9. The system of claim 8 wherein the at least one processor:
generates a laser beam path that directs a laser beam to be turned off when moved from an end point of one bounded area fill pattern to a start point of a subsequently traversed bounded area fill pattern.

10. The system of claim 7, wherein the information of the first type comprises payload data information and the information of the second type comprises non-payload information.

11. The system of claim 7 wherein the at least one processor:
groups the plurality of second type modules into one or more finder pattern bounded areas.

12. The system of claim 7 wherein the at least one processor:
grouping a number N1 of first type modules into the number N1 of first type bounded areas.

13. The system of claim 12 wherein the at least one processor:
groups a number N2 of second type modules into a number N3 of second type bounded areas, the number N3 less than the number N2.

14. The system of claim 12 wherein the at least one processor:
groups the number N1 of first type modules into the number N1 of first type bounded areas, the first type bounded areas each including a continuous outer boundary that is circular in shape.

15. The system of claim 7 wherein the at least one processor:
for each bounded area fill pattern, sets the start point on the starting path line at a directional corner, and sets the end point on the ending path line at the directional corner.

16. The system of claim 7 wherein the at least one processor:
generates a bounded area fill pattern comprising an outer boundary path line and progressively smaller path lines offset from each other by a selectable offset distance.

17. The system of claim 7, wherein the at least one processor:
controls a laser beam to traverse the laser beam path to mark a surface of an object with the machine-readable symbol.

18. The system of claim 7 wherein the at least one processor:
obtains data to be encoded; and
encodes the data into the machine-readable symbol data.

19. The system of claim 7 wherein the at least one processor:
generates a laser beam path that directs a laser beam to traverse the bounded area fill pattern for each of the first type bounded areas and the second type bounded areas by, for each bounded area, traversing each of the path lines of the bounded area fill pattern from a start point on an inner path line to an end point on the outer boundary path line.

20. A machine-readable symbol laser marking system, comprising:
a controllable laser that produces a laser beam;
at least one processor communicatively coupled to the controllable laser; and
at least one nontransitory processor-readable medium communicatively coupled to the at least one processor and which stores at least one of processor-executable instructions or data that when executed by the at least one processor of the machine-readable symbol laser marking system, cause the at least one processor to:
cause the controllable laser to traverse a laser beam path to mark a machine-readable symbol on a surface of an object, the laser beam path defined by a plurality of bounded area fill patterns each corresponding to one of a first type bounded area or a second type bounded area of the machine-readable symbol, each bounded area fill pattern comprising an outer boundary path line corresponding to an outer boundary of the corresponding bounded area and progressively smaller path lines offset from each other, the laser beam path directs the laser beam to successively traverse the bounded area fill pattern for each of the first type bounded areas and the second type bounded areas by, for each bounded area, traversing each of the path lines of the bounded area fill pattern from a start point on an starting path line to an end point on an ending path line.

* * * * *